United States Patent
Ptacek et al.

(10) Patent No.: US 11,510,356 B2
(45) Date of Patent: Nov. 29, 2022

(54) GROUND OPENER WITH FLOATING OPENER BODY

(71) Applicant: Great Plains Manufacturing, Inc., Salina, KS (US)

(72) Inventors: Timothy J. Ptacek, Assaria, KS (US); Gregory W. Arnett, Garden City, MO (US); Verne A. Hubalek, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 301 days.

(21) Appl. No.: 16/875,064

(22) Filed: May 15, 2020

(65) Prior Publication Data
US 2020/0359541 A1 Nov. 19, 2020

Related U.S. Application Data

(60) Provisional application No. 62/848,261, filed on May 15, 2019.

(51) Int. Cl.
*A01B 49/02* (2006.01)
*A01B 63/00* (2006.01)
(Continued)

(52) U.S. Cl.
CPC .............. *A01B 49/02* (2013.01); *A01B 5/04* (2013.01); *A01B 63/008* (2013.01); *A01B 15/12* (2013.01);
(Continued)

(58) Field of Classification Search
CPC ......... A01B 49/02; A01B 5/04; A01B 63/008; A01B 15/12; A01B 15/16; A01C 5/064; A01C 5/068
See application file for complete search history.

(56) References Cited

U.S. PATENT DOCUMENTS

| | | | |
|---|---|---|---|
| 3,924,694 A | 12/1975 | Baughman et al. | |
| 4,356,780 A * | 11/1982 | Bauman | A01C 5/064 172/395 |

(Continued)

FOREIGN PATENT DOCUMENTS

| | | |
|---|---|---|
| EP | 2005811 A2 | 5/2008 |
| EP | 1634489 B1 | 10/2012 |
| JP | H02182105 A | 9/1997 |

OTHER PUBLICATIONS

Search Report and Written Opinion dated Sep. 1, 2020 for related PCT Patent Application No. PCT/US2020/033076, 12 pages.
(Continued)

*Primary Examiner* — Tara Mayo-Pinnock
(74) *Attorney, Agent, or Firm* — Hovey Williams LLP; Kameron D. Kelly

(57) ABSTRACT

A ground-opening apparatus for an agricultural implement. The ground-opening apparatus comprises an opening disc for excavating a furrow in the ground, and a support assembly securing the opening disc to the agricultural implement. The support assembly comprises an upper bar, a lower bar, a forward bar, and a rearward bar. The upper bar and the lower bar extend generally in parallel relationship. The lower bar and the rearward bar are joined at a lower, rearward joint. A rotational axis of the opening disc extends through the lower, rearward joint of the support assembly.

20 Claims, 18 Drawing Sheets

(51) Int. Cl.
*A01B 5/04* (2006.01)
*A01B 15/16* (2006.01)
*A01C 5/06* (2006.01)
*A01B 15/12* (2006.01)

(52) U.S. Cl.
CPC .............. *A01B 15/16* (2013.01); *A01C 5/064* (2013.01); *A01C 5/068* (2013.01)

(56) References Cited

U.S. PATENT DOCUMENTS

| | | |
|---|---|---|
| 4,760,806 A | 8/1988 | Bigbee et al. |
| 6,119,608 A | 9/2000 | Peterson et al. |
| 6,209,466 B1 | 4/2001 | Wodrich |
| 6,237,696 B1 | 5/2001 | Mayerle |
| 6,260,632 B1 | 7/2001 | Bourgault et al. |
| 6,378,622 B1 | 4/2002 | Kostrun |
| 6,386,127 B1 | 5/2002 | Prairie et al. |
| 6,530,334 B2 | 3/2003 | Hagny |
| 6,578,502 B1 | 6/2003 | Barnstable et al. |
| 6,640,732 B2 | 11/2003 | Prairie et al. |
| 6,644,223 B2 | 11/2003 | Prairie et al. |
| 6,659,193 B1 | 12/2003 | Best et al. |
| 6,827,029 B1 | 12/2004 | Wendte |
| 6,874,584 B2 | 4/2005 | Butterfield et al. |
| 6,935,253 B2 | 8/2005 | Murray et al. |
| 7,032,527 B2 | 4/2006 | Fresen et al. |
| 7,143,704 B1 | 12/2006 | Gust et al. |
| 7,168,376 B2 | 1/2007 | Johnston |
| 7,308,859 B2 | 12/2007 | Wendte et al. |
| 7,426,893 B2 | 9/2008 | Wendte et al. |
| 7,464,767 B2 | 12/2008 | Schilling |
| 7,481,278 B1 | 1/2009 | Pomedli et al. |
| 7,568,438 B2 | 8/2009 | Arksey |
| 7,681,656 B2 | 3/2010 | Jagow et al. |
| 7,819,072 B2 | 10/2010 | Martin |
| 7,856,934 B2 | 12/2010 | Hagny |
| 7,984,768 B2 | 7/2011 | Schilling |
| 8,047,147 B2 | 11/2011 | Harnetiaux |
| 8,186,287 B2 | 5/2012 | Schilling et al. |
| 8,205,566 B2 | 6/2012 | Martin |
| 8,267,021 B2 | 9/2012 | Mariman et al. |
| 8,286,566 B2 | 10/2012 | Schilling et al. |
| 8,342,108 B2 | 1/2013 | Schilling et al. |
| 8,347,798 B2 | 1/2013 | Harnetiaux |
| 8,356,563 B2 | 1/2013 | Schallert et al. |
| 8,359,987 B2 | 1/2013 | Schilling et al. |
| 8,479,670 B2 | 7/2013 | Schilling et al. |
| 8,499,703 B2 | 8/2013 | Hagny |
| 8,555,798 B2 | 10/2013 | Schilling et al. |
| 8,635,962 B2 | 1/2014 | Schilling |
| 8,646,395 B2 | 2/2014 | Schilling et al. |
| 8,783,375 B2 | 7/2014 | Naylor et al. |
| 8,904,945 B2 | 12/2014 | Naylor et al. |
| 8,985,234 B2 | 3/2015 | Gadzella et al. |
| 9,357,692 B2 | 6/2016 | Johnson et al. |
| 9,609,802 B2 | 4/2017 | Needham et al. |
| 9,686,908 B2 | 6/2017 | Mead et al. |
| 9,788,473 B2 | 10/2017 | Tobin et al. |
| 2002/0166486 A1 | 11/2002 | Prairie et al. |
| 2009/0158981 A1 | 6/2009 | Jagow et al. |
| 2010/0192820 A1 | 8/2010 | Stark et al. |
| 2011/0005439 A1 | 1/2011 | Patwardhan et al. |
| 2011/0226167 A1 | 9/2011 | Schilling et al. |
| 2011/0282556 A1 | 11/2011 | Klenz et al. |
| 2013/0248214 A1 | 9/2013 | Adams et al. |
| 2017/0079193 A1 | 3/2017 | Sheppard |
| 2017/0238457 A1 | 8/2017 | Sieling |
| 2017/0318727 A1 | 11/2017 | Roberge et al. |
| 2018/0184580 A1 | 7/2018 | Kowalchuk et al. |

OTHER PUBLICATIONS

Search Report and Written Opinion dated Aug. 25, 2020 for related PCT Patent Application No. PCT/US2020/033084, 11 pages.
Search Report and Written Opinion dated Sep. 1, 2020 for related PCT Patent Application No. PCT/US2020/033090, 13 pages.

\* cited by examiner

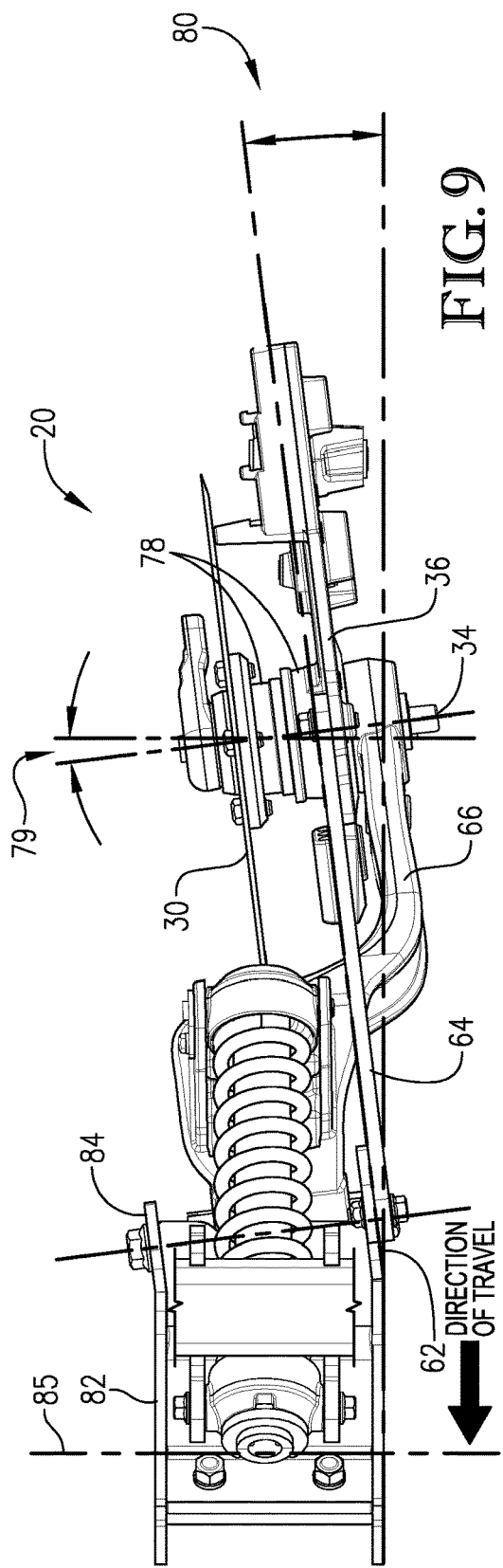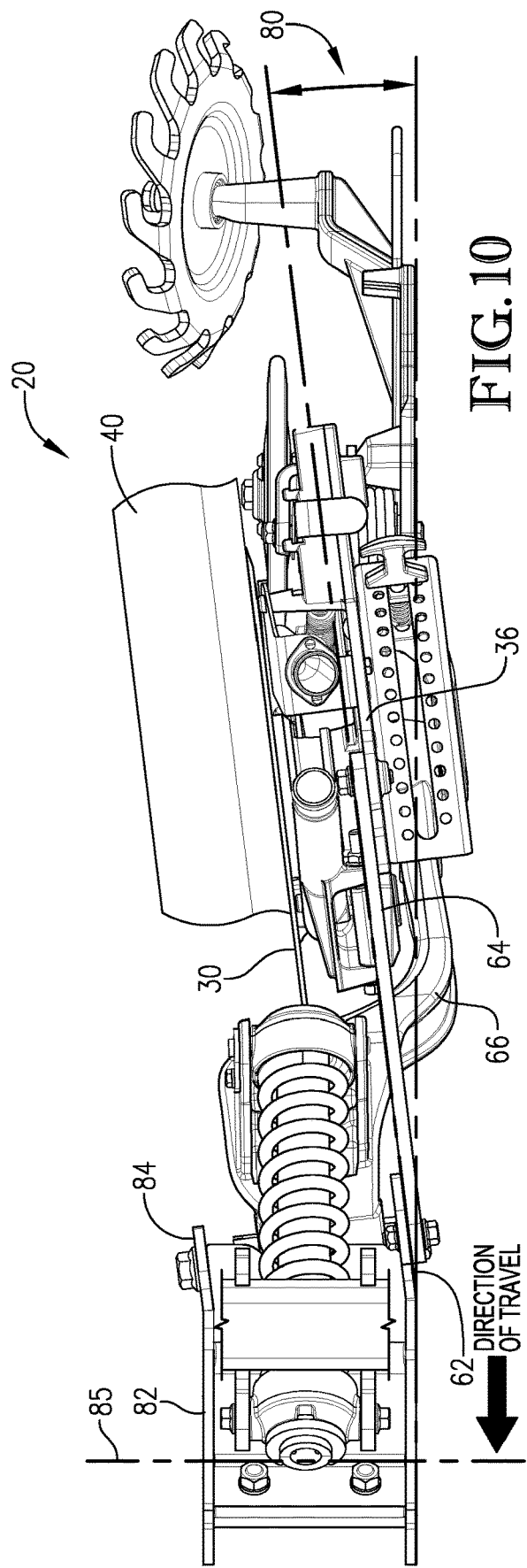

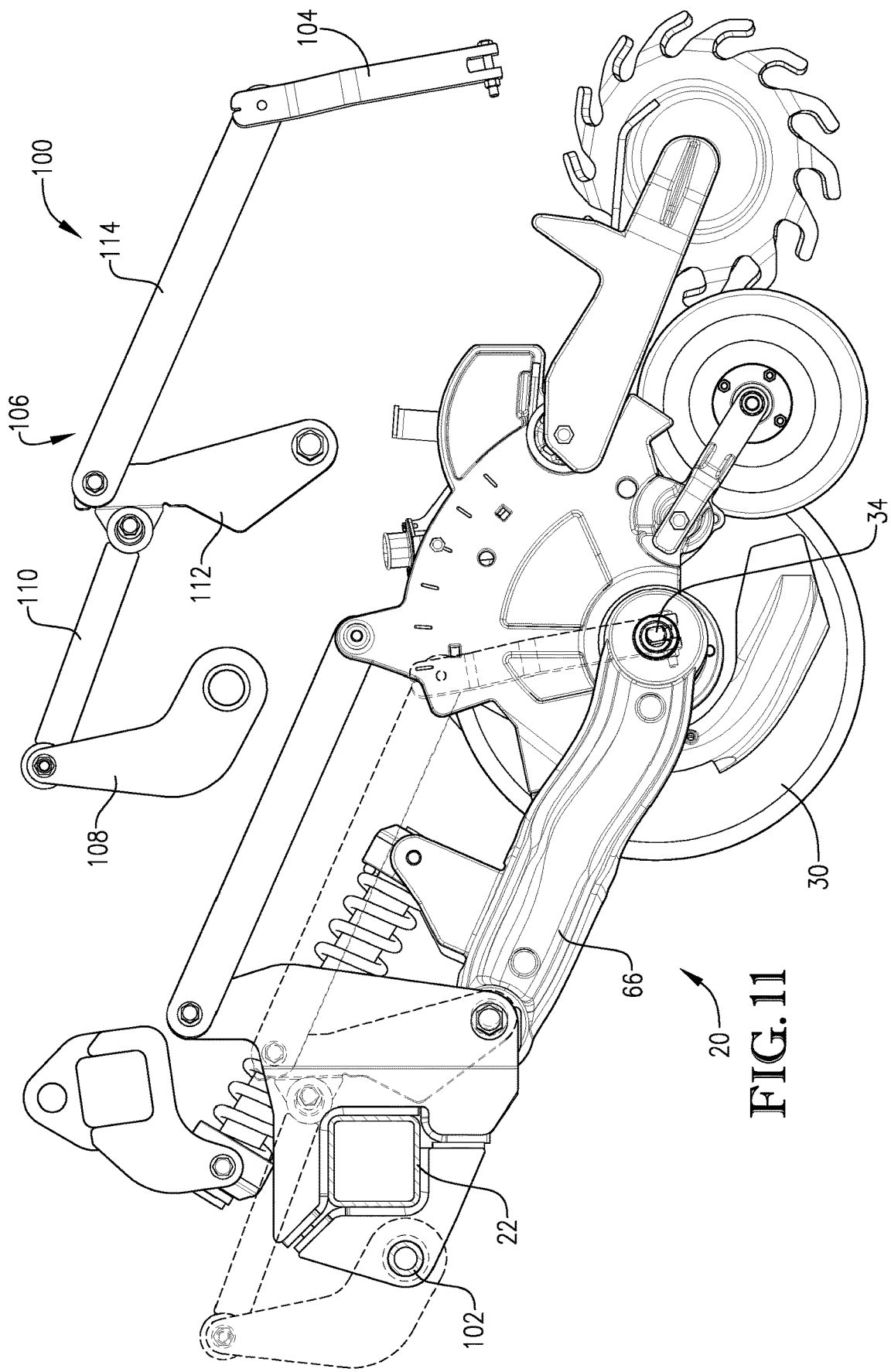

GROUND OPENER WITH FLOATING OPENER BODY

CROSS-REFERENCE TO RELATED APPLICATION

This non-provisional patent application claims priority benefit, with regard to all common subject matter, of earlier-filed U.S. Provisional Patent Application No. 62/848,261, filed May 15, 2019, and entitled "GROUND OPENER WITH FLOATING OPENER BODY." The above-identified earlier-filed provisional patent application is hereby incorporated by reference in its entirety into the present non-provisional patent application.

FIELD OF THE INVENTION

Embodiments of the present invention are directed generally to ground openers for a seeding machine. More particularly, embodiments of the present invention relate to a support assembly that effectively supports a ground opener during operation. In addition, certain embodiments of the present invention relate to a depth-adjustment assembly for simultaneously adjusting operating depths of a plurality of ground openers of a seeding machine.

BACKGROUND OF THE INVENTION

Certain agricultural implements, such as disc drills, excavate furrows or trenches in the ground soil so that agricultural products (e.g., seed or fertilizer) can be deposited down into the furrows. Commonly, a disc drill will have a plurality of ground openers attached to a frame of the disc drill. Such a configuration may be used to deposit several parallel rows of agricultural product into the soil as the disc drill is pulled through a field by a tractor or other prime mover. In some applications, each ground opener will include a single opening disc configured to excavate a furrow into the soil surface, one or more agricultural product tubes configured to deposit agricultural product into the furrow formed by the opening disc, a gauge wheel configured to adjust a depth at which the opening disc excavates down into the soil, and a closing wheel configured to fill in the furrow and to pack the displaced soil on top of the agricultural product that was deposited into the furrow.

Various types of disc drills have been known to use support assemblies, such as parallel linkage arms, that support the ground openers with respect to the frame of the disc drills. However, such previously-used support assemblies did not effectively and efficiently support and/or distribute the high loads imparted onto the ground openers during operation. As such, various components (e.g., spindles, bearings, etc.) of the previously-used ground openers would experience premature wearing and/or would prematurely fail due to inefficient load distributions.

In addition, as noted above, certain previously-used ground openers were known to include gauge wheels for adjusting an operating depth of the ground openers. Specifically, a gauge wheel could be raised and lowered with respect to its associated opening disc so as to establish an operating depth at which the opening disc excavates down into the ground soil to form the furrow. Each of such previously-used ground opener would generally include its own, independent depth-adjustment handle by which an operator could adjust the position of the gauge wheel with respect to the opening disc. As such, for disc drills that included multiple ground openers, adjusting the positions of the gauge wheels for each of the individual ground openers was a difficult and time-consuming process.

SUMMARY OF THE INVENTION

In one embodiment of the present invention, there is provided a ground-opening apparatus for an agricultural implement. The ground-opening apparatus comprises an opening disc for excavating a furrow in the ground, and a support assembly securing the opening disc to the agricultural implement. The support assembly comprises an upper bar, a lower bar, a forward bar, and a rearward bar. The upper bar and the lower bar extend generally in parallel relationship. The lower bar and the rearward bar are joined at a lower, rearward joint. A rotational axis of the opening disc extends through the lower, rearward joint of the support assembly.

In another embodiment of the present invention, there is provided an agricultural implement comprising a plurality of ground-opening apparatuses. Each of the ground-opening apparatuses includes an opening disc for excavating a furrow in the ground, and a support assembly securing the opening disc to the agricultural implement. The support assembly comprises an upper bar, a lower bar, a forward bar, and a rearward bar. The upper bar and the lower bar extend generally in parallel relationship. The lower bar and the rearward bar are joined at a lower, rearward joint. A rotational axis of the opening disc extends through the lower, rearward joint of the support assembly.

In yet another embodiment of the present invention, there is provided a method of forming a furrow with an agricultural implement that includes at least one ground-opening apparatus. The method comprises a step of supporting the ground-opening apparatus by a support assembly that includes an upper bar, a lower bar, a forward bar, and a rearward bar. The upper bar and the lower bar extend generally in parallel relationship. The lower bar and the rearward bar are joined at a lower, rearward joint. The method includes the further step of forming the furrow by excavating the ground soil with an opening disc of the ground-opening apparatus. A rotational axis of the opening disc extends through the lower, rearward joint of the support assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 9 is a top plan view of a portion of the ground opener and support assembly from FIGS. 6-7, particularly illustrating spindle bearings of an opening disc and a opener body of the ground opener, and further illustrating the opening disc being orientated at an excavation angle;

FIG. 10 a top plan view of the ground opener and support assembly from FIGS. 6-7, particularly illustrating the support assembly being orientated at an offset angle with respect to a direction of travel of the ground opener;

FIG. 11 is a side elevation view of another embodiment of a ground opener according to embodiments of the present invention, particularly illustrating a portion of a depth-adjustment assembly configurable to simultaneously adjust operating depths of a plurality of ground openers, wherein a position of the portion of the depth-adjustment assembly being operably engaged with the ground opener is shown in dashed line;

Figure 1:
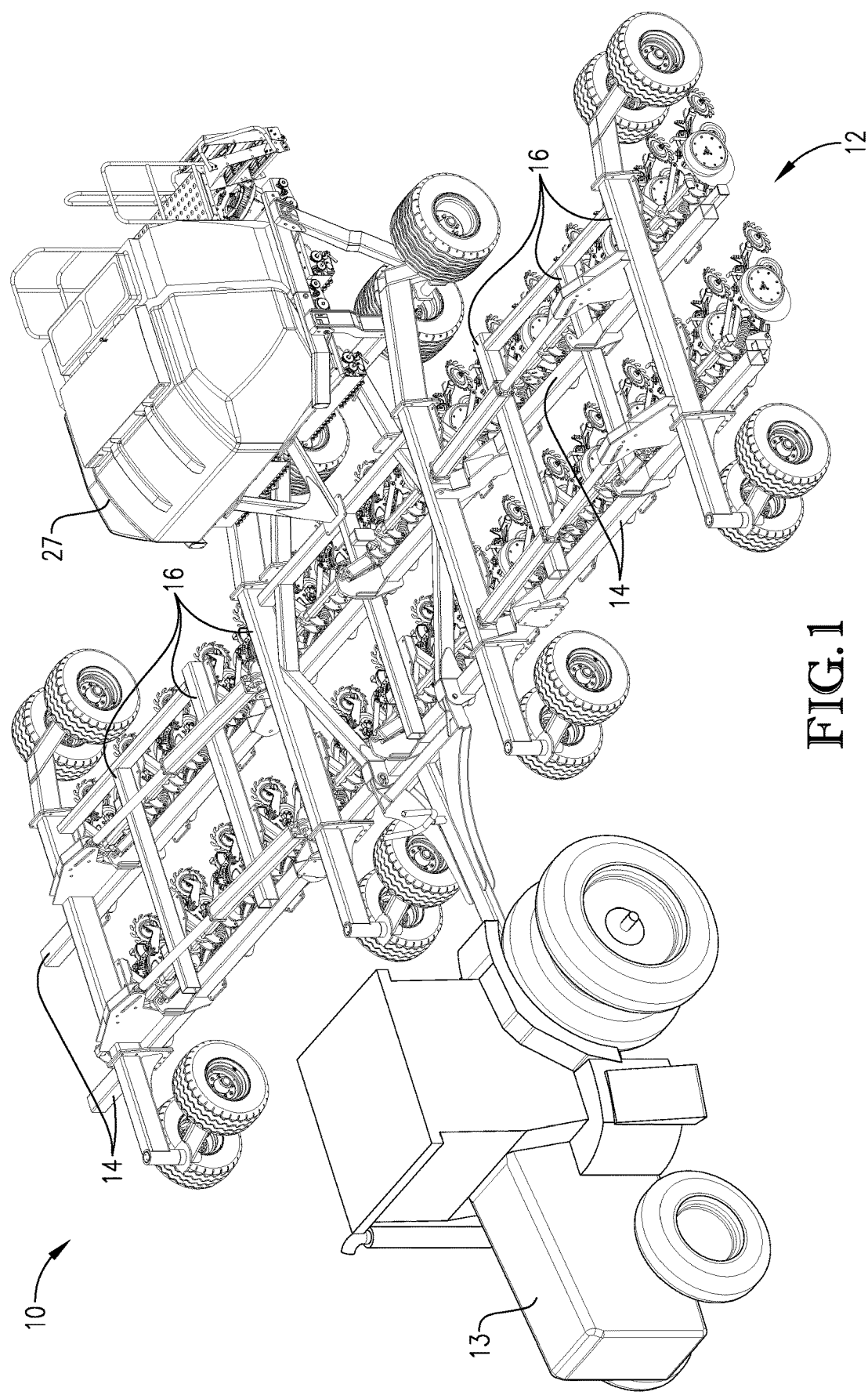
FIG. 1 is a perspective view of a disc drill and an air cart being pulled by a tractor.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
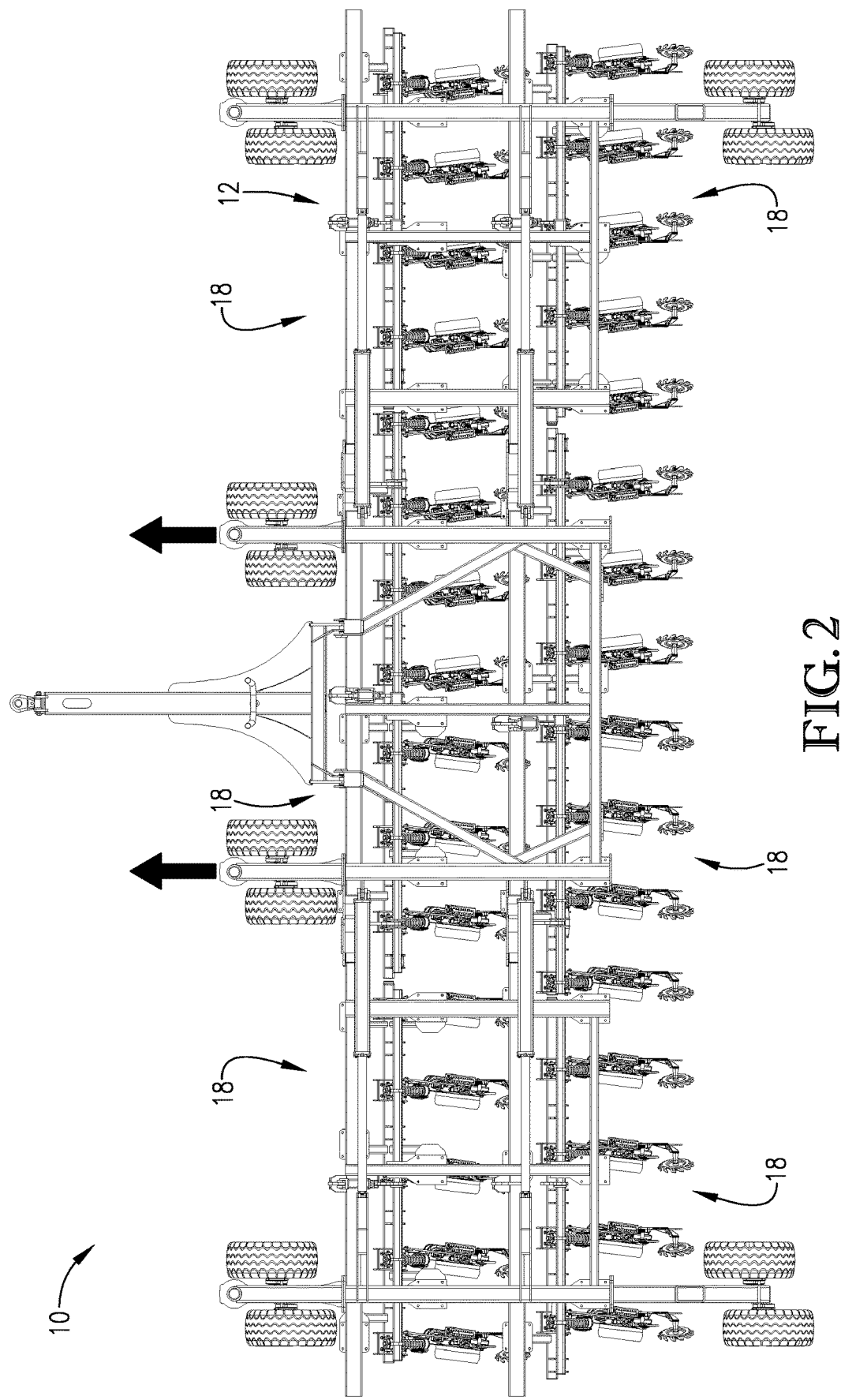
FIG. 2 is a top plan view of the disc drill from FIG. 1.
Figure 3:
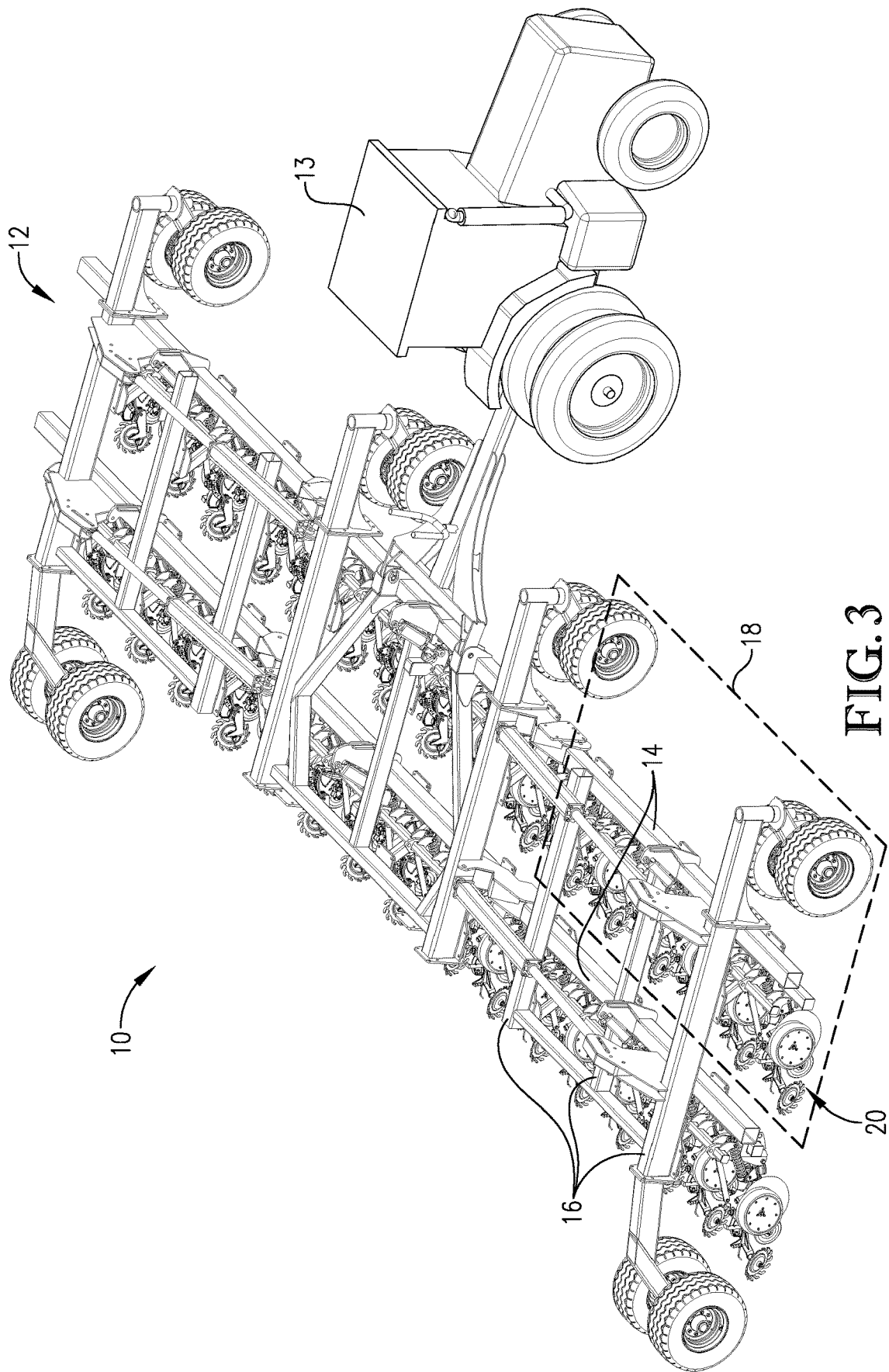
FIG. 3 is another perspective of the disc drill and the tractor from FIG. 1, particularly illustrating a plurality of opener sets connected to a frame of the disc drill, and with each of the opener sets including a plurality of ground openers.
Figure 4A:
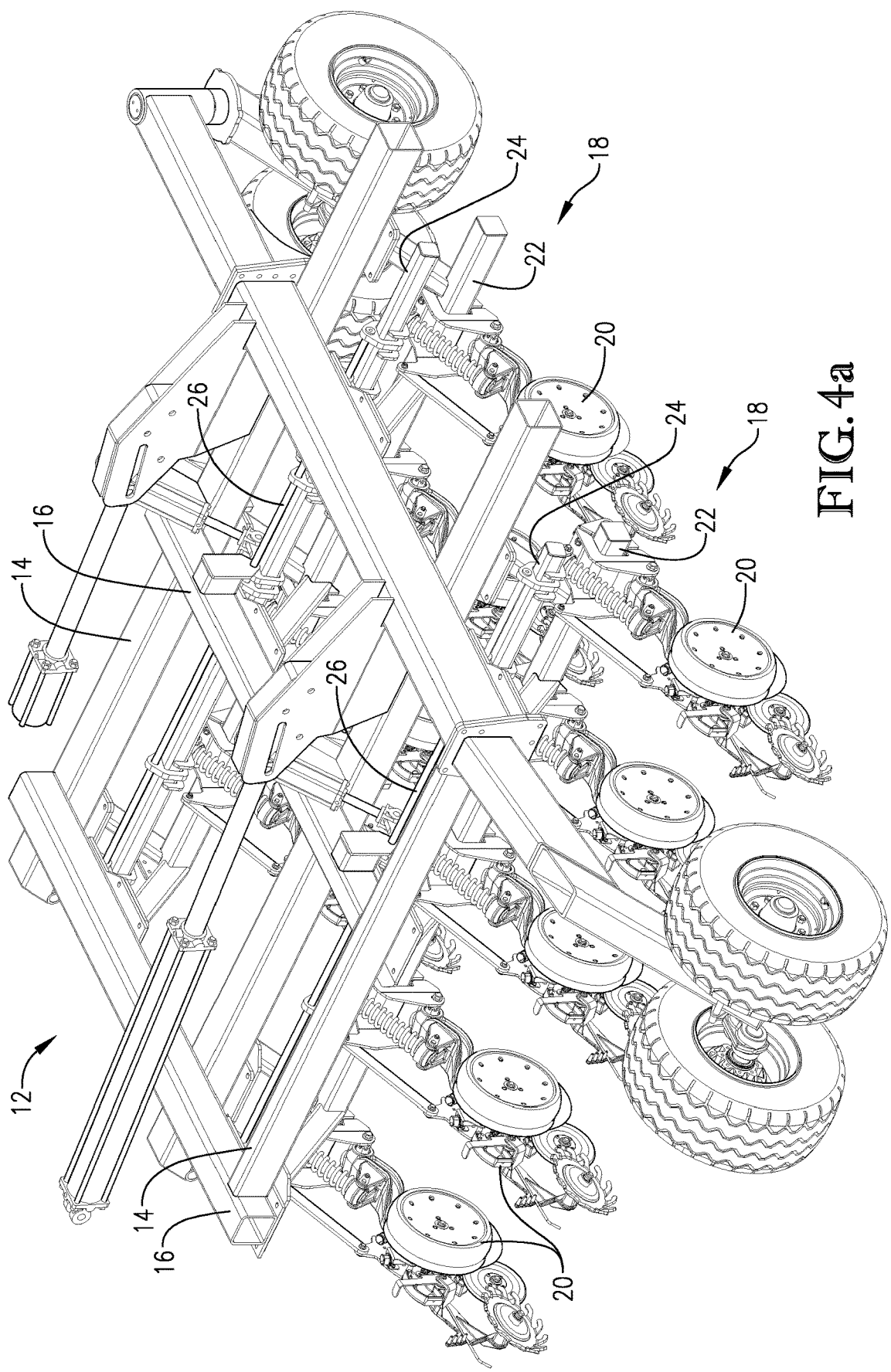
FIG. 4a is a perspective view of a portion of two opener sets (forwardly/rearwardly separated) from the disc drill of FIGS. 1-3.
Figure 4B:
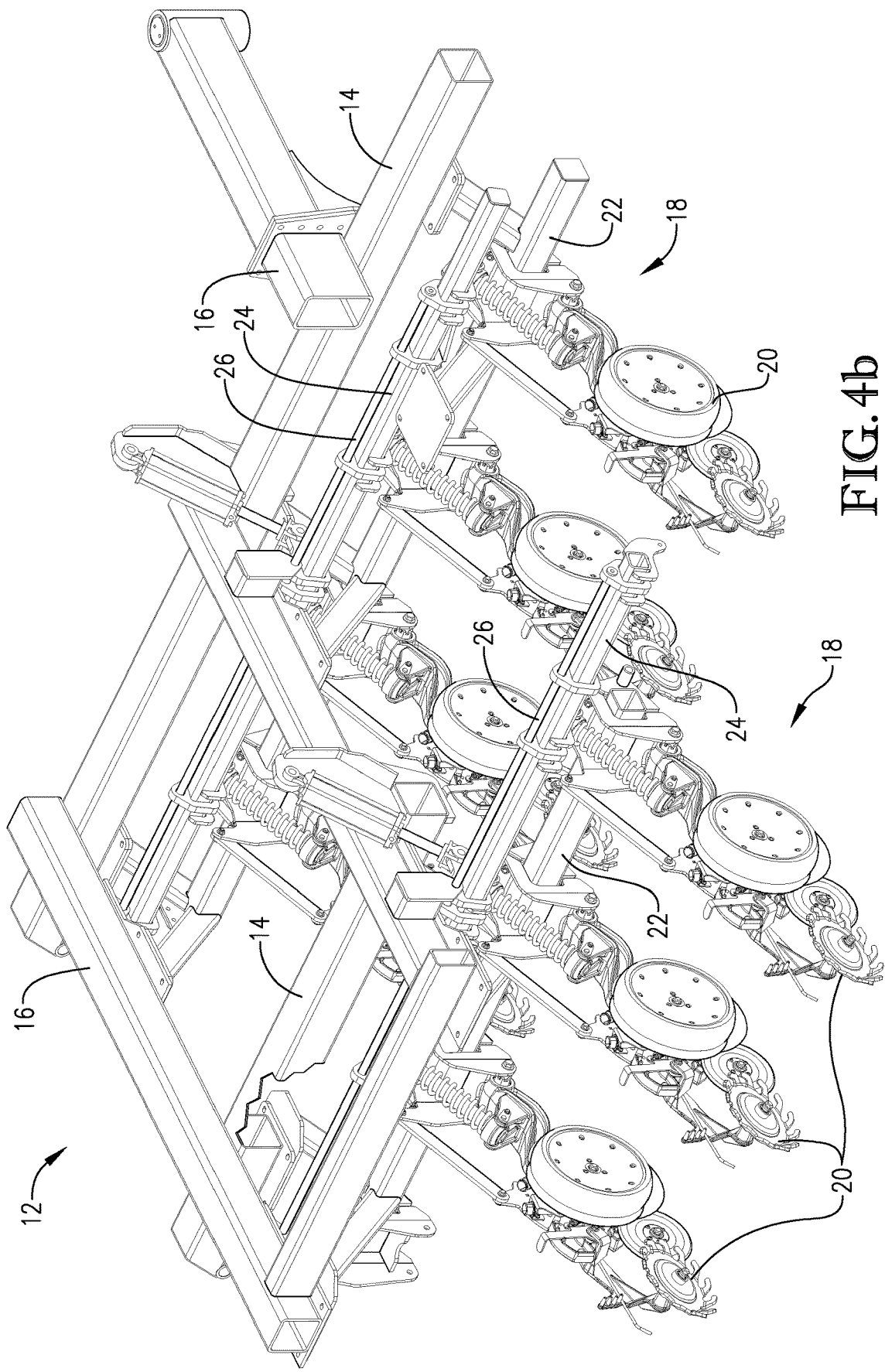
FIG. 4b is another perspective view of the two opener sets from FIG. 4a, with a portion of the frame of the disc drill removed to illustrate the ground openers and their connection with the frame.

Broadly, embodiments of the present invention are directed to ground openers for agricultural implements, such as a disc drill 10 illustrated in FIG. 1. The disc drill 10 may comprise a frame 12 that is towed by a tractor 13 or other prime mover. The frame 12 may include a plurality of laterally-extending frame elements 14 and/or a plurality of forwardly-extending frame elements 16 (based on a direction of travel of the disc drill 10). Turning to FIGS. 2 and 3, the disc drill 10 may further comprise one or more opener sets 18 secured to the frame 12. Each opener set 18, as illustrated in FIGS. 4a-5b, may comprise a plurality of (or a gang of) ground openers 20, a laterally-extending toolbar 22, and a laterally extending rockshaft 24. The toolbars 22 may be rigidly secured below the frame 12, such as by being rigidly secured to one or more of the frame elements 14, 16 of the frame 12. The rockshafts 24 may be positioned above the toolbars 22 and rotatably secured to the frame 12, such as via a pivot bar 26 secured to a bottom side one or more of the frame elements 14, 16 of the frame 12. Broadly, the ground openers 20 will be supported by and extend downward from the toolbars 22, such that the ground openers 20 can engage with the ground soil to create furrows into which agricultural product (e.g., seed and/or treatment) can be deposited. Typically, as shown in FIG. 1, the tractor 13 that pulls the seed drill 10 may additionally tow an air cart 27 which holds the agricultural product that can be supplied to the individual ground openers 20 for depositing into the ground soil. As used herein, the term "forward" refers to a direction of travel of the disc drill 10 (e.g., as pulled by the tractor 13), while the term "rearward" refers to a direction opposite the direction of travel of the disc drill 10.

Figure 6:
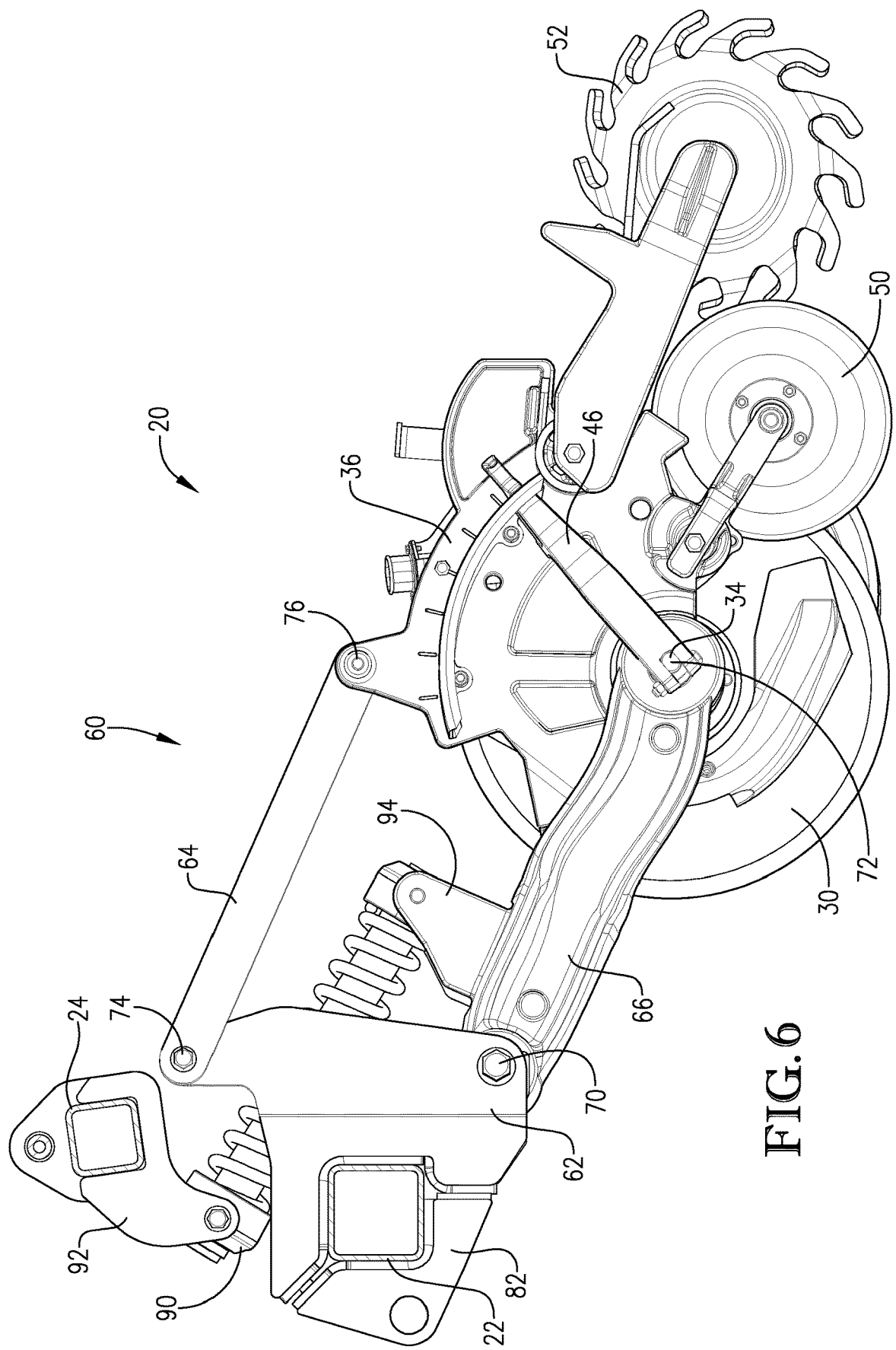
FIG. 6 is a side elevation view of one of the ground openers from FIG. 5a, with the ground opener connected to the frame of the disc drill via the support assembly according to embodiments of the present invention.
Figure 7:
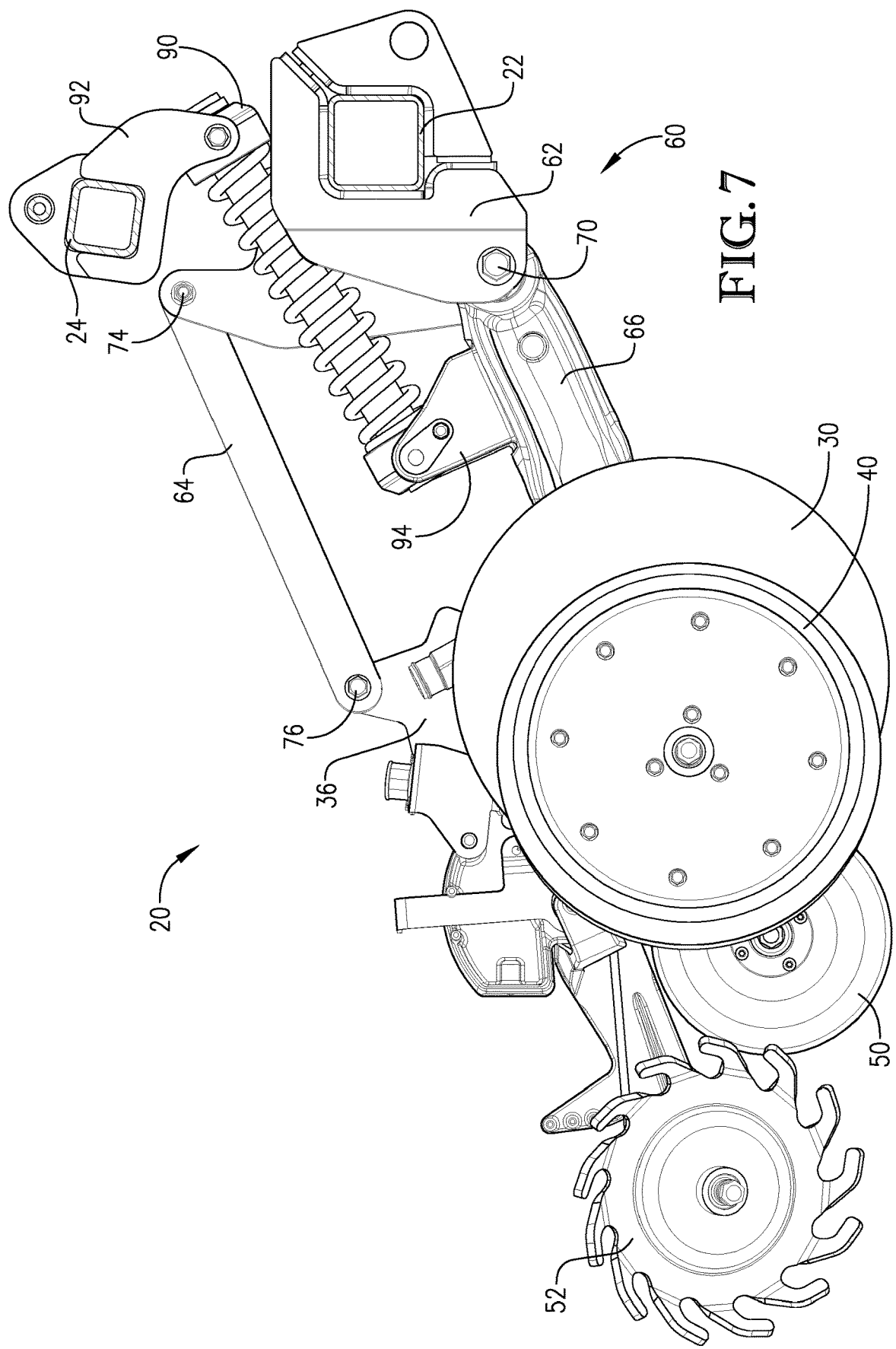
FIG. 7 is an opposite side elevation view of the ground opener from FIG. 6.
Figure 8:
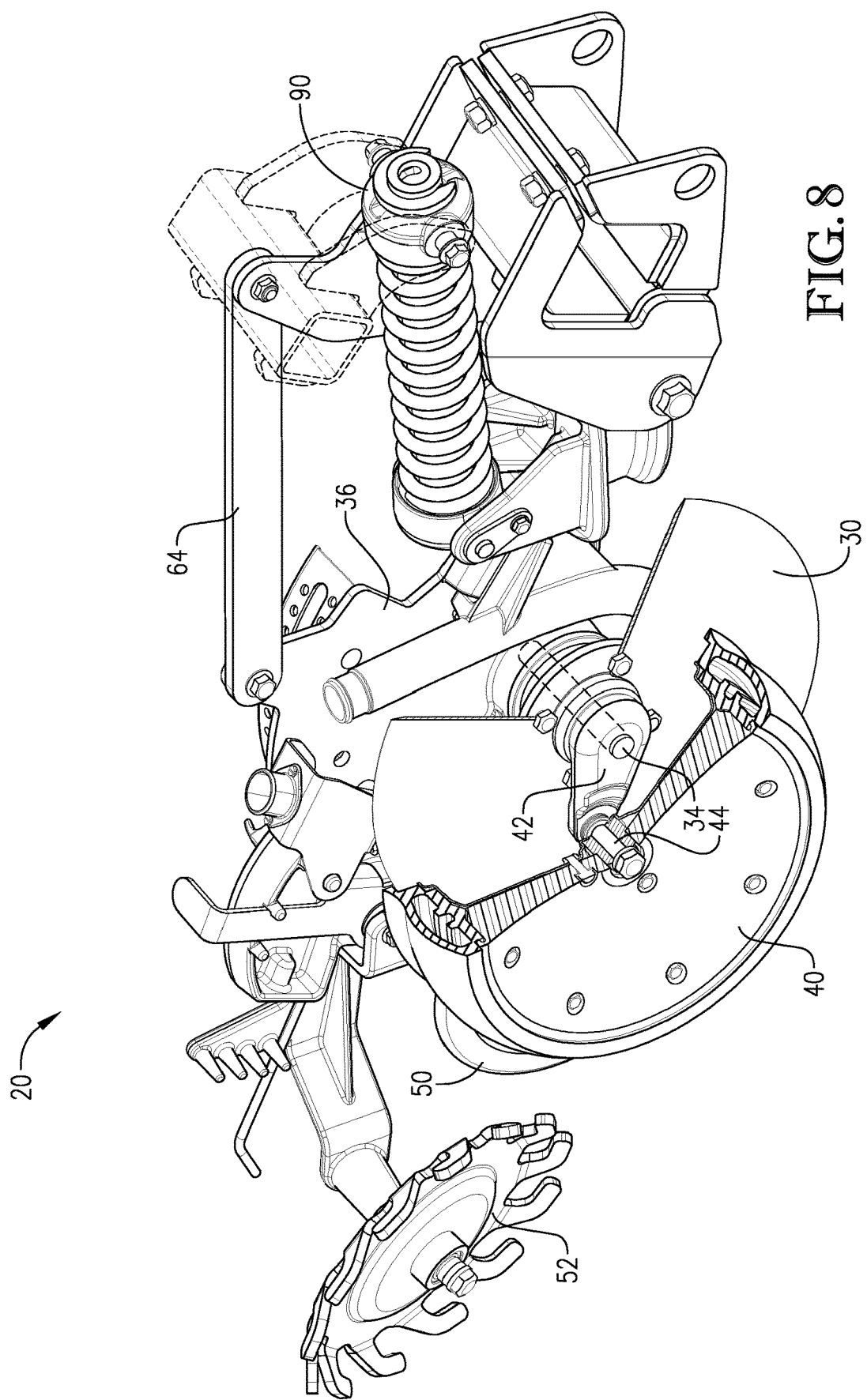
FIG. 8 perspective view of the opposite side of the ground opener shown in FIG. 7, with a portion of a gauge wheel cut away to illustrate a gauge arm used to actuate the gauge wheel.
Figure 8A:
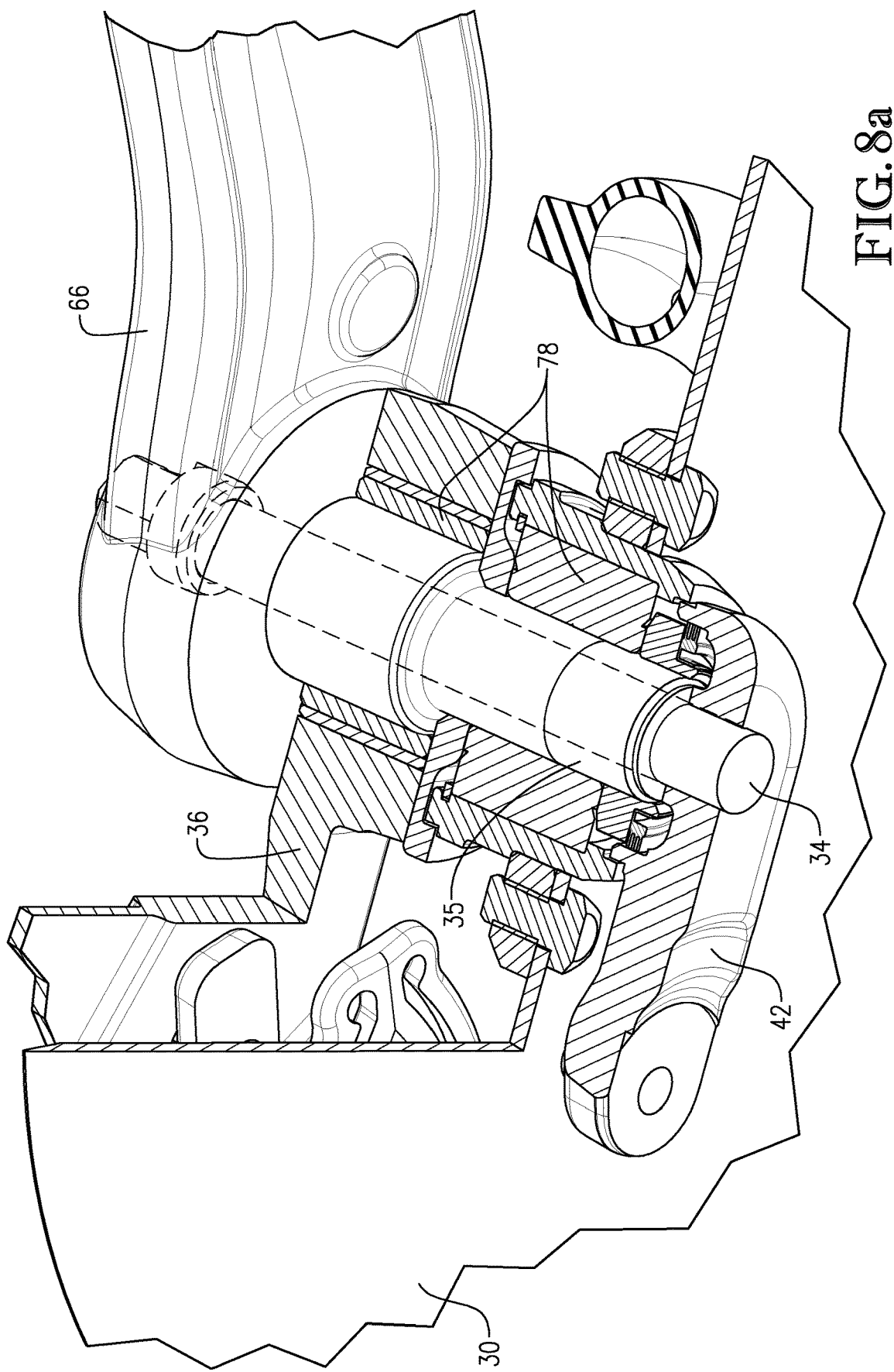
FIG. 8a is an enlarged view of a portion of the ground opener from FIG. 8, with a portion of the ground opener cut away to illustrate a disc spindle, a gauge wheel adjustment spindle, and high-load spindle bearings.

Turning to the ground openers 20 in more detail, as illustrated in FIGS. 6-8, each ground opener 20 may comprises an opening disc 30 that is used to excavate a furrow in the ground soil into which seed and/or fertilizer can be deposited. The opening disc 30 may be generally configured as a metal disc (e.g., flat or concave) that rotates about an axis of rotation. The ground openers 20 may include a gauge wheel adjustment spindle 34 and a disc spindle 35, with the gauge wheel adjustment spindle 34 being coaxial with and surrounded by the disc spindle 35 (See, e.g., FIG. 8a). In general, the gauge wheel adjustment spindle 34 will be free to rotate independently of the disc spindle 35. In some embodiments, the disc spindle 35 will remain generally stationary (non-rotating) during use of the ground opener 20. As will be discussed in more detail below, the axis of rotation of the opening disc 30 may be presented by the disc spindle 35 and/or the gauge wheel adjustment spindle 34 that is coaxial therewith, with each spindle 34, 35 extending through a center of the opening disc 30. In some embodiments, one or more high-load spindle bearings (described in more detail below with reference to FIGS. 8a, 9, and 10) may coaxially surround the disc spindle 35 so as to also surround the rotation axis about which the opening disc 30 rotates. In more detail, the disc spindle 35 (See FIG. 8a) may be formed as a tube that surrounds and is coaxial with the gauge wheel adjustment spindle 34. The high-load spindle bearings (i.e. identified by reference number 78) may be configured to rotate on and around the disc spindle 35. Specifically, as shown in FIG. 8a, the opening disc 30 is rigidly connected with the high-load spindle bearings 78 which are in contact with the disc spindle 35. As a result, the opening disc 30 may rotate about the disc spindle 35 via the high-load spindle bearings, and particularly around the rotation axis presented by the disc spindle 35 (and/or presented by the gauge wheel adjustment spindle 34 that is coaxial therewith). Because the gauge wheel adjustment spindle 34 is coaxial with the disc spindle 35, the opening disc 30 also rotates around or about the gauge wheel adjustment spindle 34. The gauge wheel adjustment spindle 34 and the disc spindle 35 may also extend through an opener body 36 of the ground opener 20. The opener body 36 may be positioned adjacent to and on a first side of the opening disc 30. As discussed in more detail below, the opener body 36 may be configured to support various components of the ground opener 20.

Embodiments provide for the opening disc 30 to be orientated such that the opening disc 30 is skewed by an excavation angle with respect to a direction of travel of the disc drill 10. Stated differently, the opening disc 30 may be rotated by the excavation angle about a vertical axis. In some embodiments, the excavation angle may be between 0 and 20 degrees, between 5 and 15 degrees, between 6 and 10 degrees, or about 7 degrees. Due to the excavation angle, as the opening disc 30 is pulled through the ground soil, a leading edge of the opening disc 30 can displace soil and create the furrow into which agricultural products can be deposited. The orientation of the opening disc 30 will be discussed in more detail below.

To establish and/or adjust a depth at which the opening disc 30 excavates the ground soil to create the furrow, the ground opener 20 may additionally comprise a gauge wheel 40, as illustrated in FIG. 7. The gauge wheel 40 may be positioned adjacent to and on a second side of the opening disc 30 (opposite the opener body 36), such that the gauge wheel 40 can roll along the ground in relatively close proximity to the opening disc 30. The operating depth of the ground opener 20, i.e., the depth at which the opening disc 30 excavates into the ground soil to create a furrow (alternatively described as a furrow depth) can be adjusted by changing a position of the gauge wheel 40 with respect to the opening disc 30. In more detail, with reference to FIG. 8, the gauge wheel 40 may be connected to the gauge wheel adjustment spindle 34 via a gauge arm 42. A first end of the gauge arm 42 may be rigidly secured to the gauge wheel adjustment spindle 34, while a second end of the gauge arm 42 is rigidly secured to a gauge wheel rotation spindle 44. The gauge wheel 40 is configured to rotate about the gauge wheel rotation spindle 44 as the gauge wheel 40 rolls along the ground. In such a configuration, rotation of the gauge wheel adjustment spindle 34 will cause a corresponding raising and/or lowering of the gauge arm 42, and thus the gauge wheel 40, with respect to the opening disc 30 (and particularly with respect to a bottom edge of the opening disc 30).

In some embodiments, as illustrated in FIG. 6, a depth-adjustment handle 46 will be rigidly secured to an end of the gauge wheel adjustment spindle 34 (opposite the gauge arm 42), such that an operator of the disc drill 10 can rotate the gauge wheel adjustment spindle 34 for purposes of raising and/or lowering the gauge wheel 40 with respect to the opening disc 30. The depth-adjustment handle 46 may be rotated across an outer surface of the opener body 36. In some embodiments, the opener body 36 may include notches for securing the depth-adjustment handle 46 in multiple pre-established positions. Alternatively, as shown in FIG. 6, the ground opener 20 may include an arcuate notch plate secured to the outer surface of the opener body 36 for securing the depth-adjustment handle 46 in multiple pre-established positions.

For example, with reference to FIG. 6, rotating the depth-adjustment handle 46 in a clockwise manner will cause the gauge arm 42, as well as the gauge wheel 40, to rotate clockwise about the gauge wheel adjustment spindle 34 (See, e.g., FIG. 8 for reference), thereby lowering the gauge wheel 40 with respect to a bottom edge of the opening disc 30. As such, because the gauge wheel 40 is configured to remain in contact with and to roll along the surface of the ground, the operating depth of the opening disc 30 will be decreased. In contrast, rotating the depth-adjustment handle 46 in a counter-clockwise manner will cause the gauge arm 42, as well as the gauge wheel 40, to rotate counter-clockwise about the gauge wheel adjustment spindle 34 (See, e.g., FIG. 8 for reference), thereby raising the gauge wheel 40 with respect to the bottom edge of the opening disc 30. As such, because the gauge wheel 40 is configured to remain in contact with and to roll along the surface of the ground, the operating depth of the opening disc 30 will be increased. Thus, an operating depth of the ground opener 20 can be adjusted by adjusting the relative positions of the gauge wheel 40 and the opening disc 30 (and particularly, the relative position of a bottom edge of the gauge wheel 40 and the bottom edge of the opening disc 30).

Remaining with FIG. 6, each of the ground openers 20 can additionally include a firming wheel 50 and a closing wheel 52. The firming wheel 50 may be connected to the opener body 36, via a connection arm, such that the firming wheel 50 extends rearward and/or downward from the opener body 36. The firming wheel 50 may be configured to follow the opening disc 30, such that the firming wheel 50 rolls along a bottom of the furrow. As such, the firming wheel 50 can press down on agricultural products (e.g., seed or treatment) deposited in the furrow, so as to firmly plant the agricultural products into the soil. The connection arm of the firming wheel 50 may be rotatably attached to the opener body 36 and spring biased downward to firm the seed in the bottom of the furrow while being able to move upwards if the firming wheel strikes a rock or similar obstruction. The connection arm may also include a lockup feature that can allow the firming wheel 50 to be raised and disengaged in extremely sticky soils that may cause build up of mud that can disrupt the seed placement. Similarly, the closing wheel 52 may be connected to the opener body 36, via a connection arm, such that the closing wheel 52 extends rearward and/or downward from the opener body 36. The closing wheel 52 may be configured to follow the opening disc 30 adjacent to the surface of the ground, so as to re-fill the furrow by forcing soil back into the furrow, thereby covering the agricultural products previously deposited into the furrow.

The connection arm of the closing wheel 52 may be rotatably attached to the opener body 36 and adjustably spring biased downward to close the furrow with more or less force in different soil conditions.

Each of the ground openers 20 may further include a support assembly 60, as illustrated in FIG. 6, which may be used to secure the ground opener 20 to the disc drill 10. In some embodiments, the support assembly 60 may be in the form of a parallel linkage assembly and/or a four-bar linkage assembly. In more detail, the support assembly 60 may secure the ground opener 20 to the toolbar 22. For instance, as illustrated in FIG. 6, the support assembly 60 may be in the form of a four-bar linkage with a forward bar 62, an upper bar 64, a lower bar 66, and a rearward bar. In certain embodiments, the rearward bar may take the form of the opener body 36, which was previously described and shown.

The lower bar 66 may be rotatably joined with the forward bar 62 at a first pivot joint 70 (a lower, forward joint), such that the lower bar 66 can rotate with respect to the forward bar 62 by an axis presented by the first joint 70. Similarly, the lower bar 66 may rotatably joined with the rearward bar (e.g., the opener body 36) at a second pivot joint 72 (lower, rearward joint), such that the lower bar 66 can rotate with respect to the rearward bar by an axis presented by the second joint 72. As was previously described, the gauge wheel adjustment spindle 34 may form part of (and/or be aligned with) the second joint 72. As such, the gauge wheel adjustment spindle 34 may extend through the lower bar 66. However, it should be noted that the gauge wheel adjustment spindle 34 may be configured to rotate with respect to the lower bar 66 (e.g., via actuation of the depth-adjustment handle 46). In some specific embodiments, the disc spindle 35 (which surrounds and is coaxially aligned with the gauge wheel adjustment spindle 34) may be rigidly secured to the lower bar 66 so as to form part and/or to be aligned of the second joint 72. In addition, the upper bar 64 may be rotatably joined with the forward bar 62 at a third pivot joint 74 (upper, forward joint), such that the upper bar 64 can rotate with respect to the forward bar 62 by an axis presented by the third joint 74. Similarly, the upper bar 64 may be rotatably joined with the rearward bar (e.g., the opener body 36) at a fourth pivot joint 76 (upper, rearward joint), such that the upper bar 64 can rotate with respect to the rearward bar by an axis presented by the fourth joint 76. As will be described in more detail below, the support assemblies 60, in the form of the four-bar linkages, can function to support the ground openers 20 with respect to the frame 12 of the disc drill 10 during operation of the disc drill 10. As such, the ground openers 20 can be used to form furrows, to plant agricultural products (e.g., seed and/or treatment) within the furrows, and to fill in the furrows once the agricultural products have been planted. In addition, the support assembly 60 can be used to facilitate raising and lowering of the ground openers 20 with respect to the frame 12 of the disc drill 10 and/or with respect to the ground surface.

Beneficially, as illustrated in FIG. 6, embodiments of the present invention provide for the gauge wheel adjustment spindle 34 to coincide with and/or to form the second joint 72 (i.e., the lower, rearward joint) of the support assembly 60. In particularly, the gauge wheel adjustment spindle 34 is configured to extend through the opener body 36 at the second joint 72, thereby providing for the opener body 36 to pivotally float about the gauge wheel adjustment spindle 34 and/or the second joint 72. Stated differently, the opener body 36 is configured to pivotally float (e.g., via the bearings 78) about the rotational axis presented by the gauge wheel adjustment spindle 34 located at the second joint 72. Furthermore, because the disc spindle 35 is positioned around and coaxial with the gauge wheel adjustment spindle 34, the opener body 36 is configured to pivotally float (e.g., via the bearings 78) on the disc spindle 35 about the second joint 72 and/or the rotational axis presented by the disc spindle 35. Each of the opening disc 30 and the opener body 36 is pivotally secured to the disc spindle 35 via high-load spindle bearings 78, as is shown in FIGS. 8a and 9. As a result, returning to FIG. 6, the axis of the second joint 72 can be the same as the rotational axis of the opening disc 30 (i.e., the axis presented by the gauge wheel adjustment spindle 34 and/or the disc spindle 35). Such a configuration provides for improved load and torque distribution through the ground opener 20. Specifically, the high loads imparted on the opening disc 30 during excavation of the furrow will be imparted directly to the support assembly 60 via the gauge wheel adjustment spindle 34 (and/or the disc spindle 35 and the high-load spindle bearings 78) at the second joint 72 of the support assembly 60. This is different from many prior art configurations, in which the rotational axis of the opening disc may be offset from an adjacent joint of the support assembly (e.g., as in prior parallel linkages and/or four-bar linkages). For instance, in prior ground openers, the rotational axis of the opening disc would generally be offset from the lower, rearward joint of the support assembly. In such prior configurations, high loads and torques were required to be passed from the opening disc through the opener body to the adjacent joints of the support assembly. Such distribution of forces created unwanted loads and torques which would lead to premature wearing and failure of components (e.g., bearings and joints) of the ground openers. It is noted that in certain embodiments of the present invention, as shown in FIG. 6, the firming wheel 50 and/or the closing wheel 52 may impart some additional loads and/or torques on the support assembly 60 (e.g., opener body 36); however, such additional loads and/or torques are relatively minor compared to the high loads imparted onto the opening disc 30 during operation of the ground opener 20.

Embodiments of the present invention also provide for improved load and torque distribution, and thus more consistent wearing of components of the ground opener 20, via the orientation of support assembly 60. As noted above, the opening disc 30 is skewed by an excavation angle that facilitates the opening disc's 30 ability to form the furrow. FIG. 9 may best illustrate the excavation angle of the opening disc 30 via reference numeral 79. In many prior art ground opener, such an excavation angle was created by positioning the rotational axis of the opening disc (presented via the disc's spindle or axle) at the required excavation angle through the opener body. However, as was noted above, in prior art ground openers, the rotational axis of the opening disc is generally offset from the lower, rear joint of the support assembly (e.g., parallel linkage and/or four-bar linkage). As such, unwanted wearing of the lower, rear joint of the support assembly can be caused by the force imparted onto the lower, rear joint across the opener body from the opening disc. Such unwanted wearing is known to counteract the positioning/orientation of the rotational axis of the opening disc, such that the rotational axis of the opening disc can unwantedly change from the intended excavation angle over the life of the ground opener.

Beneficially, embodiments of the present invention are configured to maintain the opening disc 30 in the intended excavation angle 79 by way of the support assembly 60 (at least a portion thereof) being orientated at an offset angle 80 (See FIGS. 9 and 10) with respect to a direction of travel of the disc drill 10. In embodiments in which the support assembly 60 comprises a four-bar linkage, the components of the support assembly 60 will extend generally along directions that are coplanar and/or that are parallel with each other. For example, in some embodiments, the lower bar 66 and the upper bar 64 will extend parallel to each other. Similarly, in some embodiments, the forward bar 62 and the rearward bar (e.g., the opener body 36) will extend parallel to each other. Furthermore, in some embodiments, each of the forward bar 62, the lower bar 66, the upper bar 64, and the rear bar (e.g., the opener body 36) will extend parallel with each other. Furthermore still, in some embodiments, the forward bar 62, the lower bar 66, the upper bar 64, and the rear bar (e.g., the opener body 36) may all extend in coplanar relationships, such that each of the bars extend substantially along the same given plane. In some alternative embodiments, however, only a portion of the bars of the support assembly 60 will extend parallel with each other. For instance, as illustrated in FIGS. 9 and 10, a front portion of the lower bar 66 may be offset from a rear portion of the lower bar 66. These front and rear portions of the lower bar 64 may be parallel with one another. However, the front portion may be connected to the rear portion via middle connecting section, which does not extend in parallel relationship with the front and rear portions of the lower bar 66 or with other components of the support assembly 60. Nevertheless, in some embodiments, at least a portion of each of the forward bar 62, the lower bar 66, the upper bar 64, and the rear bar (e.g., the opener body 36) may extend in parallel relationship with each other.

In addition to extending in parallel relationship, as was noted above, embodiments provide for the components of the support assembly 60 to extend at an offset angle 80 with respect to the direction of travel of the disc drill 10, as is shown in FIGS. 9 and 10. In more detail, in some embodiments, one or more (or all) of the forward bar 62, the lower bar 66, the upper bar 64, and the rear bar (e.g., the opener body 36) may extend rearward in such a manner that the support assembly 60 is generally orientated at the offset angle 80 with respect to the direction of travel of the disc drill 10. In some embodiments, the offset angle 80 will be equivalent to the excavation angle 79 of the opening disc 30, which was previously described. For example, the opening disc 30 may be supported by the support assembly 60, e.g., via the spindle bearings 78, such that the excavation angle 79 of the opening disc 30 is generally equivalent to the offset angle 80 of the support assembly. In some specific embodiments, the offset angle 80 may be between 0 and 20 degrees, between 5 and 15 degrees, between 6 and 10 degrees, or about 7 degrees. It should be noted that the offset angle 80 may, in some embodiments, generally comprise a lateral offset measured as a lateral angular distance between the support assembly 60 and the direction of travel (as shown in FIGS. 9 and 10). Stated differently, the offset angle 80 is a rotation about a generally vertical axis that is perpendicular to the direction of travel of the seed drill 10.

To facilitate the orientation of the support assembly 60, it is noted that the ground opener 20 may include a collar mount 82, as shown in FIGS. 6, 9, and 10, which is rigidly secured about the toolbar 22. The forward bar 62 of the support assembly 60 may extend from the collar mount 82 at an angle, which is equal to the offset angle 80. In some embodiments, the forward bar 62 may be formed from the same material as the collar mount 82, but may be deformed (e.g., bent) so as to extend at the offset angle 80. In alternative embodiments, the forward bar 62 may be secured to the collar mount 82 via welding, fasteners, or the like. In some embodiments, the forward bar 62 will positioned on one side of the collar mount 82, such that the upper bar 64 and the lower bar 66 are attached to the one side of the collar mount 82 via the forward bar 62. However, in some embodiments, as illustrated in FIGS. 9 and 10, a mounting arm 84 may extend rearward from the collar mount 82 on an opposite side of the collar mount. Such mounting arm 84 may also extend at the offset angle 80. For structural stability, certain embodiments provide for a fastener, which forms the first joint 70 securing the lower bar 66 with the forward bar 62, to be secured to both the forward bar 62 and the mounting arm 84.

As discussed above, each of the lower bar 66 and the upper bar 64 may extend rearward generally in the direction of the offset angle 80 to their respective joints 72, 76 with the rearward bar (e.g., the opener body 36). The rearward bar, which may be in the form of the opener body 36, may also be orientated at the offset angle 80. Thus, the gauge wheel adjustment spindle 34 and/or the disc spindle 35, which extends through the opener body 36, will extend at an angle that corresponds with the offset angle 80. In particular, the gauge wheel adjustment spindle 34 and/or the disc spindle 35 may extend at the excavation angle 79 of the opening disc 30 (as shown in FIG. 9), which is measured in relation to a direction orthogonal to the direction of travel of the disc drill 10. For example, the axis 85 illustrated in FIGS. 9 and 10 as extending along a direction of the toolbar 22 will be orthogonal to the direction of travel of the disc drill 10. Embodiments provide for the opening disc 30, which rotates about the gauge wheel adjustment spindle 34 and/or the disc spindle 35 to be orientated at the excavation angle 79, with respect to such an orthogonal direction to the direction of travel. For example, the disc spindle 35 is rigidly supported by the lower bar 66 at the offset angle with respect to a direction perpendicular to the direction of travel (i.e., axis 85). Because the opening disc 30 is configured to rotate about the disc spindle 35, the opening disc 30 is therefore rotatably secured to the lower bar and is also orientationally skewed by the offset angle with respect to the direction of travel. As noted previously, the excavation angle 79 will generally be equal to the offset angle 80 of the support assembly 60. Specifically, the support assembly 60 extending at the offset angle 80 (with respect to the direction of travel of the disc drill 10) will cause the opening disc 30 to extend at the excavation angle 79 (with respect to a direction orthogonal to the direction of travel of the disc drill 10).

In addition to defining the support assembly 60 as extending at the offset angle 80, the configuration of the support assembly 60 may also be defined based on an orientation of the joints 70, 72, 74, 76. Specifically, as perhaps best shown in FIG. 9, given the orientation of the support assembly 60, the axes defined by the joints 70, 72, 74, 76 (reference numerals can be seen in FIG. 6) will be configured to extend at the offset angle 80 with respect to a direction that is orthogonal to the direction of travel of the support assembly 60. It should be clear, therefore, that due to the second joint 72 (corresponding with the gauge wheel adjustment spindle 34 and/or the disc spindle 35) extending at the offset angle 80, the opening disc 30 will be configured to be orientated at the intended excavation angle 79.

The extension of the support assembly 60 at the offset angle 80 provides for the ground opener 20 of embodiments of the present invention to have various benefits from prior art ground openers. As was discussed above, many prior art ground openers would have their opening disc axes offset from the joints of the support assemblies. Generally, the opening disc axes would be offset at an excavation angle, while the joints of the support assemblies would generally not be offset. Such a configuration allowed for problematic loads and torques at the joints of the support assemblies, which would cause premature wearing and failure of the joints as well as a gradual shifting of the opening disc away from the intended excavation angle. Embodiments of the present invention provide efficient and improved load distribution through the ground opener 20, consistent wear on the joints of the support assembly 60, and persistent orientation of the opening disc 30 at the excavation angle 79 due to the configuration of the support assembly 60 described above (i.e., the orientation of the support assembly 60 and/or the joints 70, 72, 74, 76 at the offset angle 80 and the lower, rearward joint (i.e., second joint 72) of the support assembly 60 aligning with the gauge wheel adjustment spindle 34 and/or the disc spindle 35 of the opening disc 30).

In further embodiments of the present invention, each of the ground openers 20 will include, as illustrated in FIGS. 6 and 7, a down-pressure device 90, which is configured to apply a consistent downward pressure on the opening disc 30 as the opening disc 30 travels through the ground soil, forming the furrow. In some embodiments, the down-pressure device 90 may comprise a spring. In alternate embodiments, the down-pressure device 90 may comprise a piston-cylinder (e.g., hydraulic cylinder), electric actuator (e.g., linear actuator or motor), gear assembly and/or various other types of actuators. The down-pressure device 90 may, in some embodiments, extend between the support assembly 60 and the rockshaft 24.

Specifically, in some embodiments, a first end of the down-pressure device may be rotatably connected to the rockshaft 24 via a pair of mount arms 92. A second end of the down-pressure device 90 may be rotatably connected to the lower bar 66 of the support assembly 60 via a pair of mount arms 94. As such, the down-pressure device 90 will be supported by the rockshaft 24 so as provide a downward force against the support assembly 60 and, thus, to the opening disc 30. Beneficially, as was described previously, the lower bar 66 receives and/or supports at least a portion of the gauge wheel adjustment spindle 34 and/or the disc spindle 35, about which the opening disc 30 rotates. Thus, because the down-pressure device 90 is directly connected to the lower bar 66 (via the mount arms 94), the down-pressure device 90 can apply an appropriate down-pressure/down-force to the opening disc 30 (e.g., via the lower bar 66 and the gauge wheel adjustment spindle 34 and/or the disc spindle 35) without having numerous linkages between the down-pressure device 90 and the opening disc 30. As a further benefit, the opening discs 30 are attached to the disc drill 10 frame 12 by individualized support assemblies 60 (and down-pressure devices 90) which allow the ground openers 20 to operate independently of one another. Such independence allows the opening discs 30 to independently respond to changes in terrain and field obstructions. It should be understood that, in some embodiments, the support assemblies 60 will be skewed (e.g., laterally skewed) at their offset angles 80 regardless of whether the support assemblies 60 are in the raised positions or the lowered positions (with such raising/lowering being accomplished by actuators 96 discussed below). However, in some embodiments, the down-pressure devices 90 may be connected to the respective rockshaft 24 and/or to the lower bar 66 in a manner that permits the down-pressure device 90 (or at least a portion thereof) to rotate or pivot about a longitudinal axis of the down-pressure device 90. Such rotation or pivoting permits the down-pressure device 90 to be raised and lowered along with the support assembly 60 even though the rockshaft 24 is generally perpendicular to the direction of travel of the seed drill 10 and the support assembly 60 is skewed with respect to the direction of travel of the seed drill 10. Specifically, at least a portion of the down-pressure device 90 (e.g., the rearward portion) may translate from side to side as the down-pressure device 90 is raised and lowered.

Figure 5A:
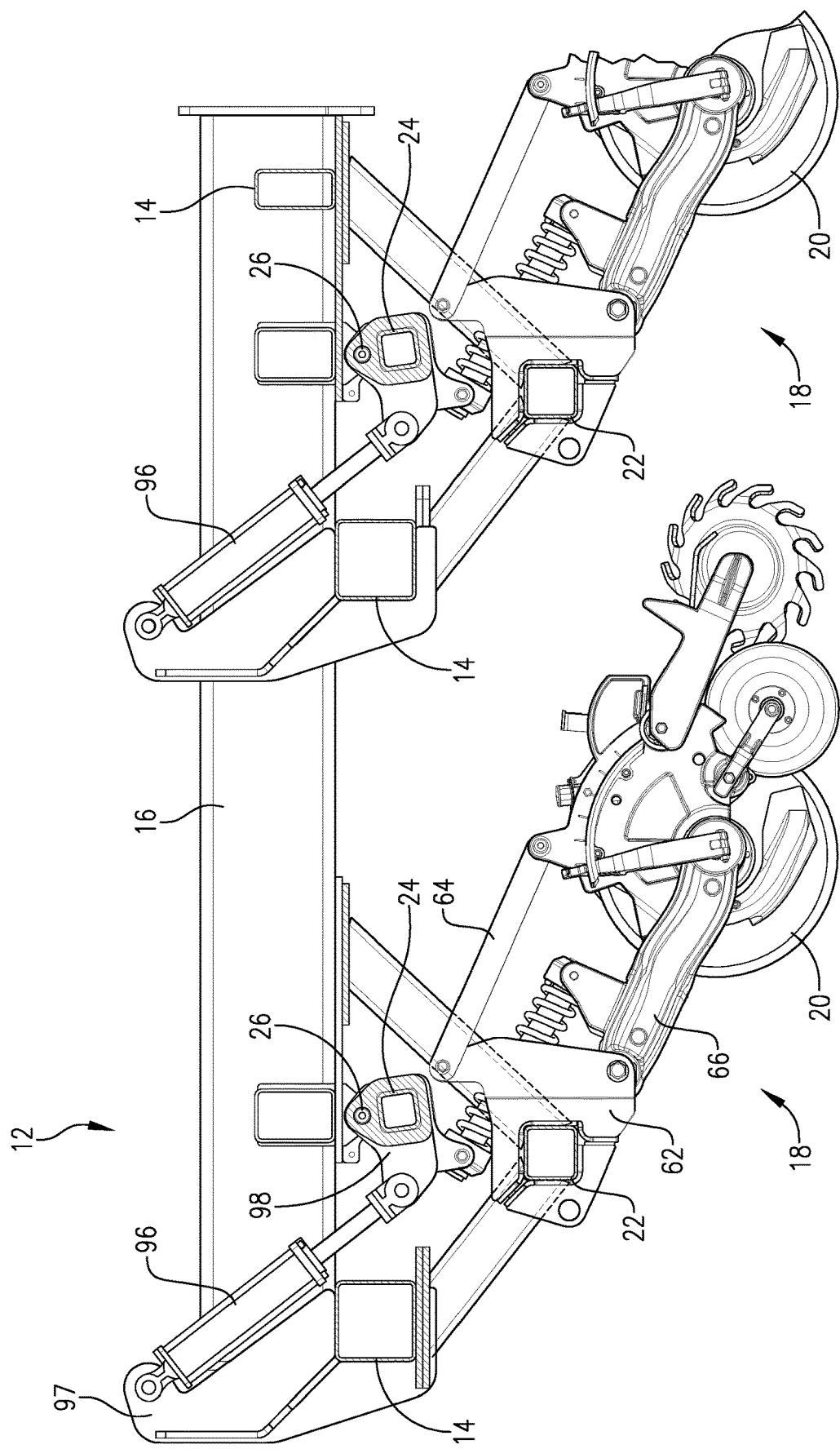
FIG. 5a is a side elevation view of two ground openers, from separate opener sets, secured to the frame of the disc drill from FIGS. 1-4b via support assemblies, with the ground openers configured in a lowered position.
Figure 5B:
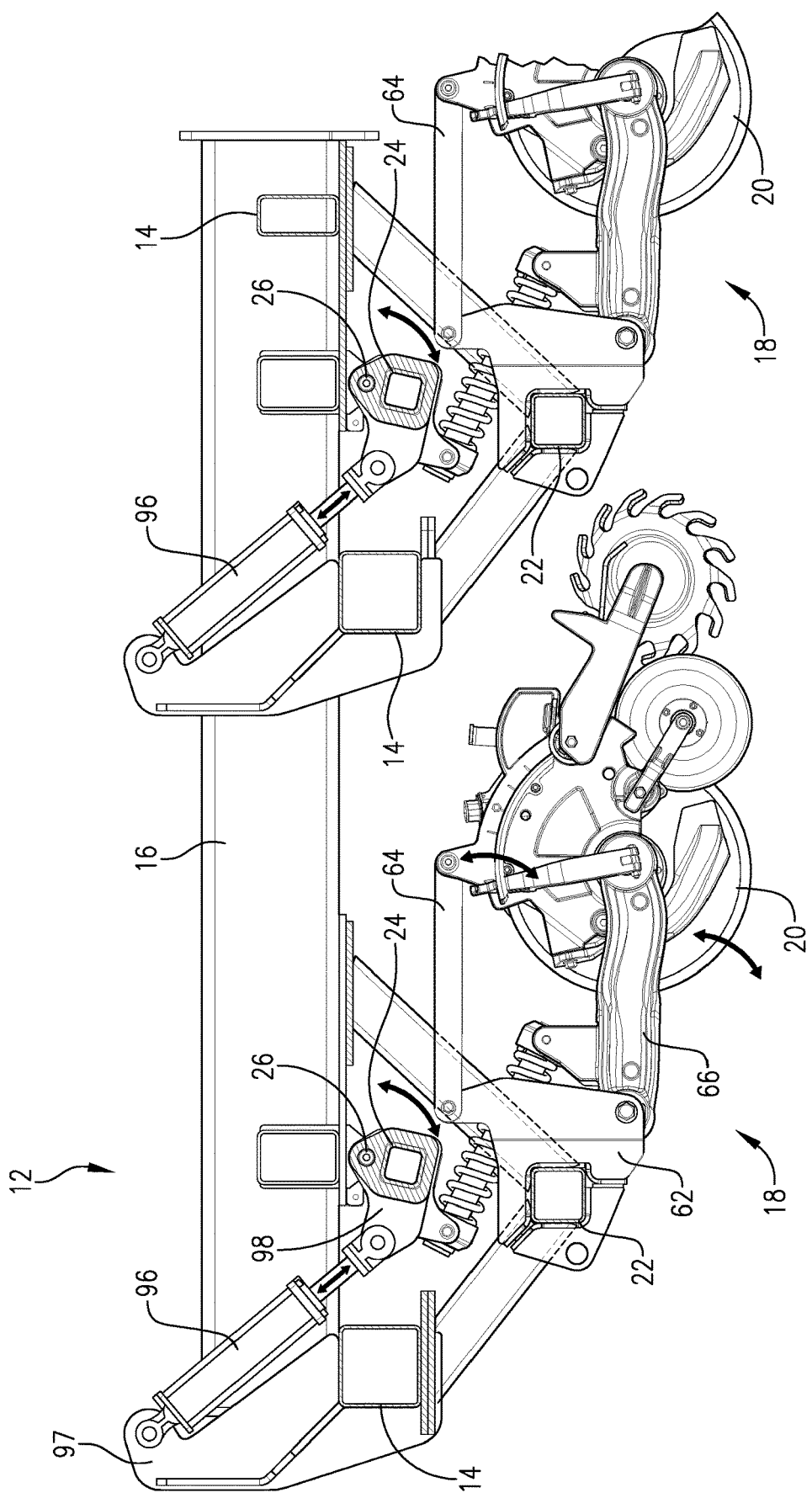
FIG. 5b is another side elevation view of the two ground openers from FIG. 5a, with the ground openers configured in a raised position.

The rockshaft 24 may also be configured to raise and lower each of the ground openers 20 that form part of a common opener set 18. To accomplish such raising and lowering, as illustrated in FIGS. 5a and 5b, each opener set 18 may comprise one or more actuators 96 (e.g., hydraulic cylinders, electric actuators, pneumatic actuators, motors, gear assemblies, or the like) that extend between the rockshaft 24 and the frame 12 of the disc drill 10. For instance, a first end of the actuator 96 may be pivotally secured to a mount arm 97 extending from one or more of the frame elements 14, 16. A second end of the actuator 96 may be pivotally secured to a mount arm 98 that extends from the rockshaft 24. Because the rockshaft 24 is pivotally secured the frame 12 via the pivot bar 26, actuation of the actuator 96 can be used to cause rotation of the rockshaft 24. Rotating the rockshaft 24 will cause a corresponding raising or lowering of each of the ground openers 20 that are included within the common opener set 18. For example, with reference to FIG. 5a, extension of the actuator 96 will cause a counter-clockwise rotation of the rockshaft 24. Such a counter-clockwise rotation of the rockshaft 24 will force the down-pressure device 90 downward against the support assembly 60, thereby lowering the ground opener 20 by way of the upper bar 64 and the lower bar 66 rotating downward about the forward bar 62. In such a manner, the ground opener 20 can be lowered into contact with the ground. When the ground opener 20 is in contact with the ground, continued rotation of the rockshaft 24 (counter-clockwise) will increase the down-pressure/down-force experienced by the ground opener 20 (i.e., the pressure exerted by the ground opener 20 into/onto the ground). Specifically, rotation of the rockshaft 24 (counter-clockwise) will increase the down-pressure/down-force by compressing the down-pressure device 90 (e.g., a spring). Nevertheless, the ground opener 20 is configured to move upward and downward as necessary over uneven soil (e.g., downwardly if the ground has a depression and/or upwardly if the ground has a mound/hump). In contrast, with reference to FIG. 5b, retraction of the actuator 96 will cause a clockwise rotation of the rockshaft 24. Such a clockwise rotation of the rockshaft 24 will force the down-pressure device 90 upward, pulling against the support assembly 60, thereby raising the ground opener 20 by way of the upper bar 64 and the lower bar 66 rotating up about the forward bar 62. If the ground opener 20 remains engaged with the ground, the rotation of the rockshaft 24 (clockwise) will decrease the down-pressure/down-force experienced by the ground opener 20 (i.e., the pressure exerted by the ground opener 20 into/onto the ground). Specifically, rotation of the rockshaft 24 (clockwise) will decrease the down-pressure/down-force by decompressing the down-pressure device 90 (e.g., a spring). It is noted that control of the actuators 96 of the seed drill 10 may be controlled remotely, such as by the operator positioned in a cab of the tractor. The ground openers 20 may be raised for various reasons, such as during transportation of the seed drill 10.

Figure 12:
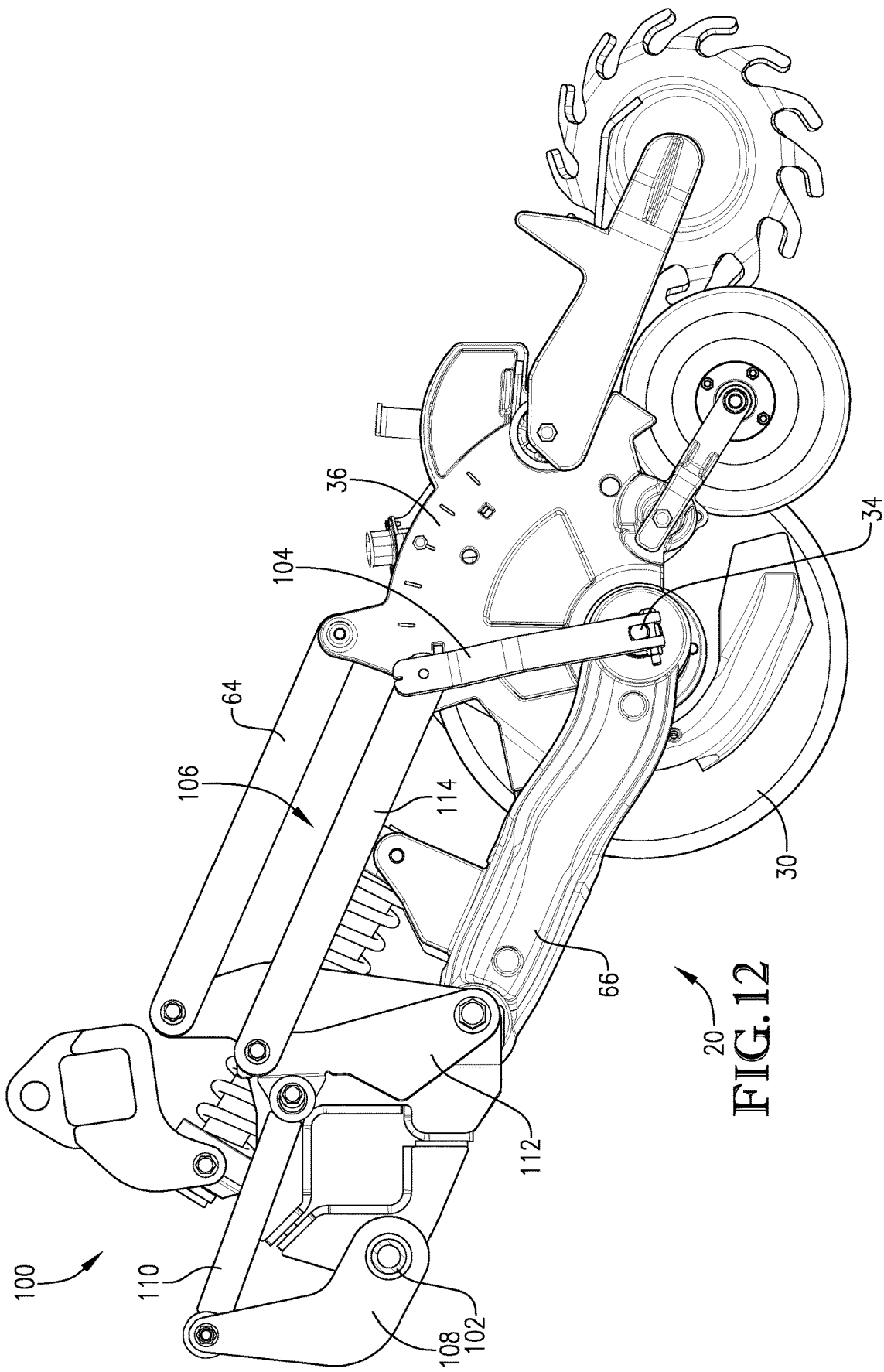
FIG. 12 is another side elevation view of the ground opener from FIG. 11, particularly illustrating the portion of the ground-adjustment assembly being operably engaged with the ground opener.
Figure 13:
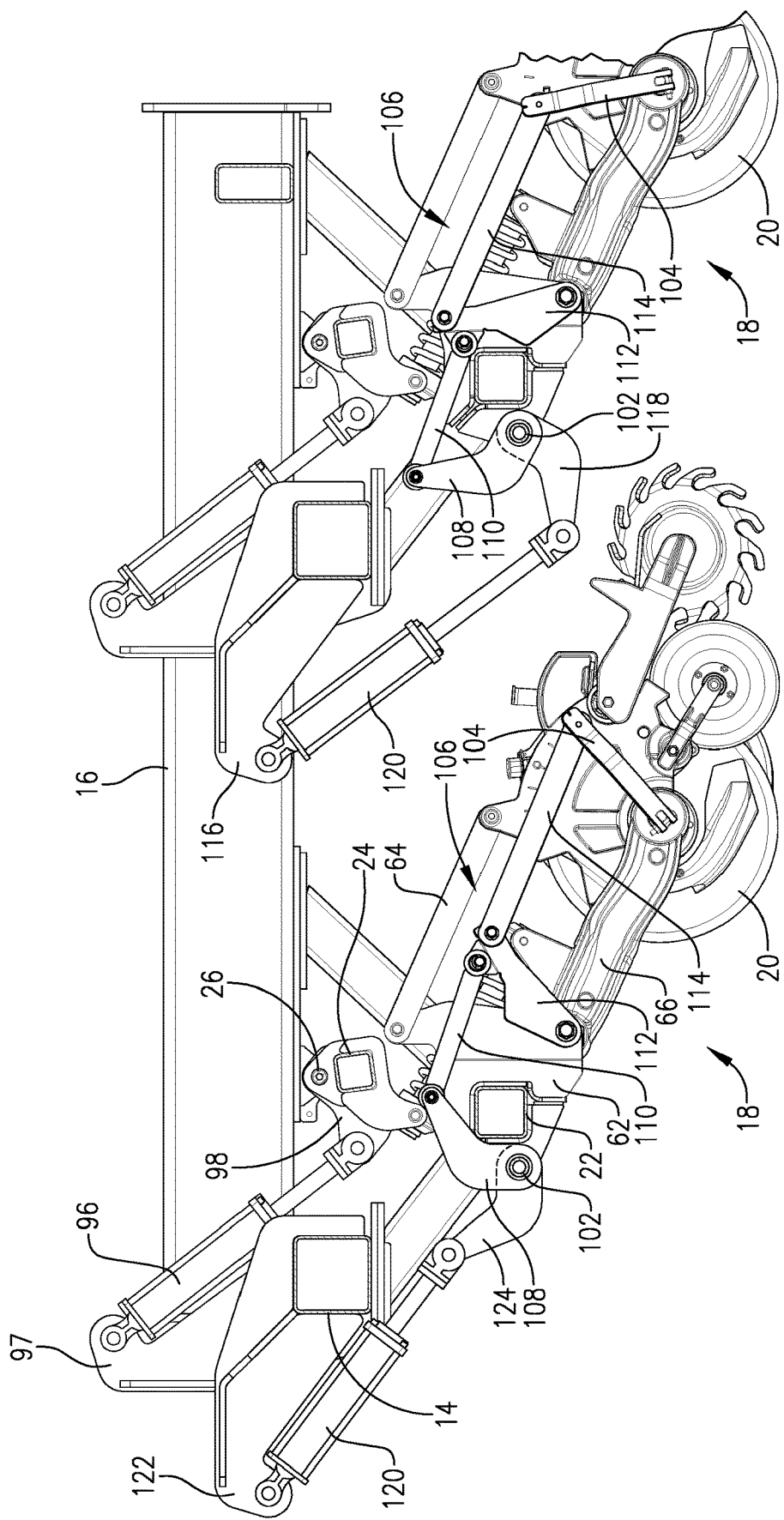
FIG. 13 is a side elevation view of two ground openers, from separate opener sets, secured to a frame of a disc drill via support assemblies, with the ground openers each including at least a portion of a depth-adjustment assembly for simultaneously adjusting operating depths of ground openers of the same opener set.

In addition to raising and lowering the ground openers 20 of a given opener set 18, certain embodiments of the present invention may include a common depth-adjustment assembly 100, illustrated in FIGS. 11-13, configured to simultaneously adjust an operating depth of each of the ground openers 20 of the given opener set 18. The depth-adjustment assembly 100 may, in some embodiments, be used in place of the individual depth adjustment handles 46, which were previously described. In more detail, the depth-adjustment assembly 100 may comprise a common pivot bar 102 that extends laterally across the opener set 18. Such lateral extension is perhaps best shown in FIGS. 14 and 15. In some embodiments, the common pivot bar 102 may extend adjacent to the toolbar 22. For example, each of the collar mounts 82 securing the ground openers to the toolbar 22 may include a through hole, such that the pivot bar 102 can be positioned through such through holes in a manner that provides for the pivot bar 102 to rotate within the through holes of the collar mounts 82

As perhaps best illustrated in FIGS. 11 and 12, the depth-adjustment assembly 100 may further include, for each of the ground openers 20 within the same opener set 18, a depth-adjustment arm 104 and a parallel linkage assembly 106 connecting the depth-adjustment arm 104 to the pivot bar 102. In more detail, the depth-adjustment arm 104 may be rigidly connected to the gauge wheel adjustment spindle 34, such that rotation of the depth-adjustment arm 104 will cause a rotation of the gauge wheel adjustment spindle 34 and a corresponding raising or lowering of the gauge wheel 40 (not shown in FIGS. 11 and 12) with respect to the opening disc 30. As such, the depth-adjustment arm 104 may function similar to the depth-adjustment handle 46, which was previously described. However, in contrast to the depth-adjustment handle 46 (which is configured to be actuated manually by the hand of an operator), the depth-adjustment arm 104 is configured to be rotated by the parallel linkage assembly 106, which is actuated via rotation of the pivot bar 102.

In more detail, the parallel linkage assembly 106 may comprise a first pivot arm 108 that is rigidly secured to the pivot bar 102, such that rotation of the pivot bar 102 causes a corresponding rotation of the first pivot arm 108. In some embodiments, the first pivot arm 108 may be secured to the pivot bar 102 via a pin, a fastener, or other similar components. Alternatively, the first pivot arm 108 may have a through hole with a shape that conforms to an exterior shape of the pivot bar 102, such that rotation of the pivot bar 102 (which passes through the through hole) causes a corresponding rotation of the first pivot arm 108.

The parallel linkage assembly 106 may, in some embodiments, additionally include a first linkage arm 110, a second pivot arm 112, and a second linkage arm 114. The first linkage arm 110 may be pivotally secured to the first pivot arm 108 and may extend rearward so as to be pivotally secured to the second pivot arm 112. The second pivot arm 112 may be pivotally secured to the support assembly 60. In some specific embodiments, the second pivot arm 112 may be pivotally secured to the support assembly 60 and the first pivot joint 70 (i.e., the lower, forward joint). The second linkage arm 114 may be pivotally secured to the second pivot arm 112 and may extend rearward to the depth-adjustment arm 104 where the second pivot arm 112 and the depth-adjustment arm 104 are pivotally secured together. In some embodiments, as illustrated in FIG. 11, the second linkage arm 114 may extend in parallel relationship with the upper and lower bars 64, 66 of the support assembly 60. Given such parallel relationship between the parallel linkage assembly 106 and the support assembly 60, some embodiments may provide for the parallel linkage assembly 106 (and/or the depth-adjustment arm 104) to be orientated at the skewed angle 80 along with the support assembly 60.

Given the configuration described above, the parallel linkage assembly 106 and the depth-adjustment arm 104 associated with a given ground opener 20 may be actuated so as to adjust the operating depth of the given ground opener 20. In particular, with reference to FIG. 13, if the common pivot bar 102 is rotated clockwise, the parallel linkage assembly 106 will be actuated rearward. Upon the parallel linkage assembly 106 being actuated rearward, the depth-adjustment arm 104 will be rotated clockwise (with reference to FIG. 13), such that the gauge wheel 40 will be shifted downward with respect to a bottom edge of the opening disc 30, thereby reducing the operating depth of the ground opener 20. In contrast, if the common pivot bar 102 is rotated counter-clockwise, the parallel linkage assembly 106 will be actuated forward. Upon the parallel linkage assembly 106 being actuated forward, the depth-adjustment arm 104 will be rotated counter-clockwise (with reference to FIG. 13), such that the gauge wheel 40 will be shifted upward with respect to a bottom edge of the opening disc 30, thereby increasing the operating depth of the ground opener 20. Beneficially, because the parallel linkage assemblies 106 and the depth-adjustment arms 104 of each of the ground openers 20 of a particular opener set 18 are connected with the common pivot bar 102, the depth-adjustment assembly 100 provides for the operating depths of each of the ground openers 20 of the particular opener set 18 to be simultaneously adjusted via rotation of the pivot bar 102. It should also be noted that due to the parallel relationship between the depth adjustment parallel linkage assembly 106 and the support assembly 60 four bar linkage, the depth of the furrow can be maintained at a constant magnitude (i.e., unchanged) while the ground opener 20 moves up and down when following uneven terrain. Specifically, due to the parallel relationship between the parallel linkage assembly 106 and the support assembly 60, the parallel linkage assembly 106 is configured to maintain a constant relationship between the opener disc 30 and the gauge wheel 40 as the ground opener 20 shifts up and down relative to the frame 12. It should further be noted that because of this favorable parallel relationship it is possible to raise a front or rear opener set 18 of ground openers 20 without affecting the seeding depth of the other opener set 18, even though the depth adjustments may be linked (e.g., as described below with respect to the linkage 140). Such a configuration is useful for purposes such as to provide wider row and seed spacing only using half of available ground openers 20. One example of doing this would be to plant wheat at "7.5 inch" spacing and then raise half the ground openers 20 and plant soybeans at "15 inch" spacing with the same disc drill 10. Even though half the ground openers 20 are fully raised the common depth actuator 120 (discussed in more detail below) can still be used control the ground openers 20 that remain engaged within the ground with no additional changes needed.

Figure 14:
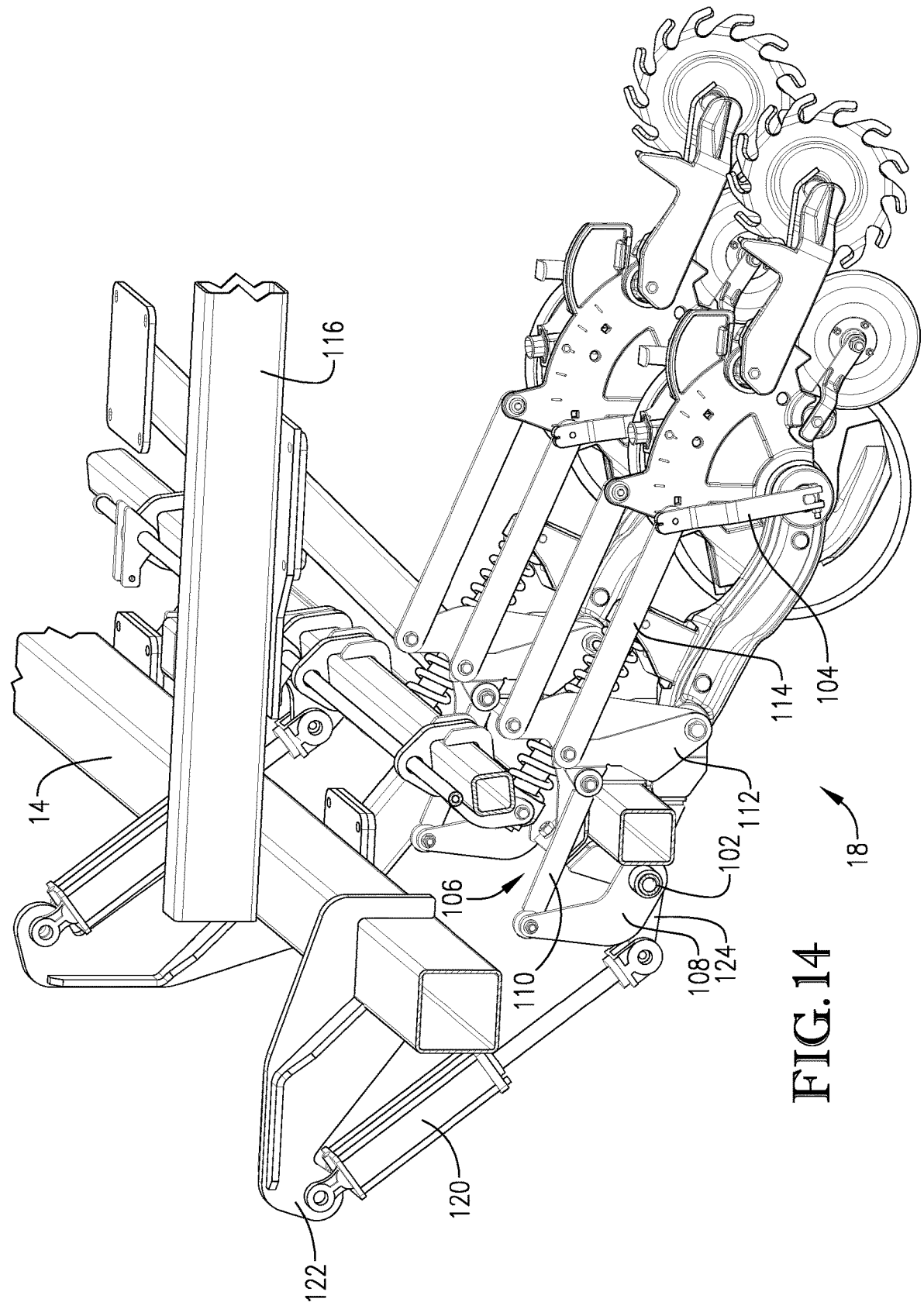
FIG. 14 is a rearward perspective view of two ground openers, from the same opener set, secured to a frame of a disc drill via support assemblies, with the opener set including a depth-adjustment assembly for simultaneously adjusting the operating depth of the two ground openers.
Figure 15:
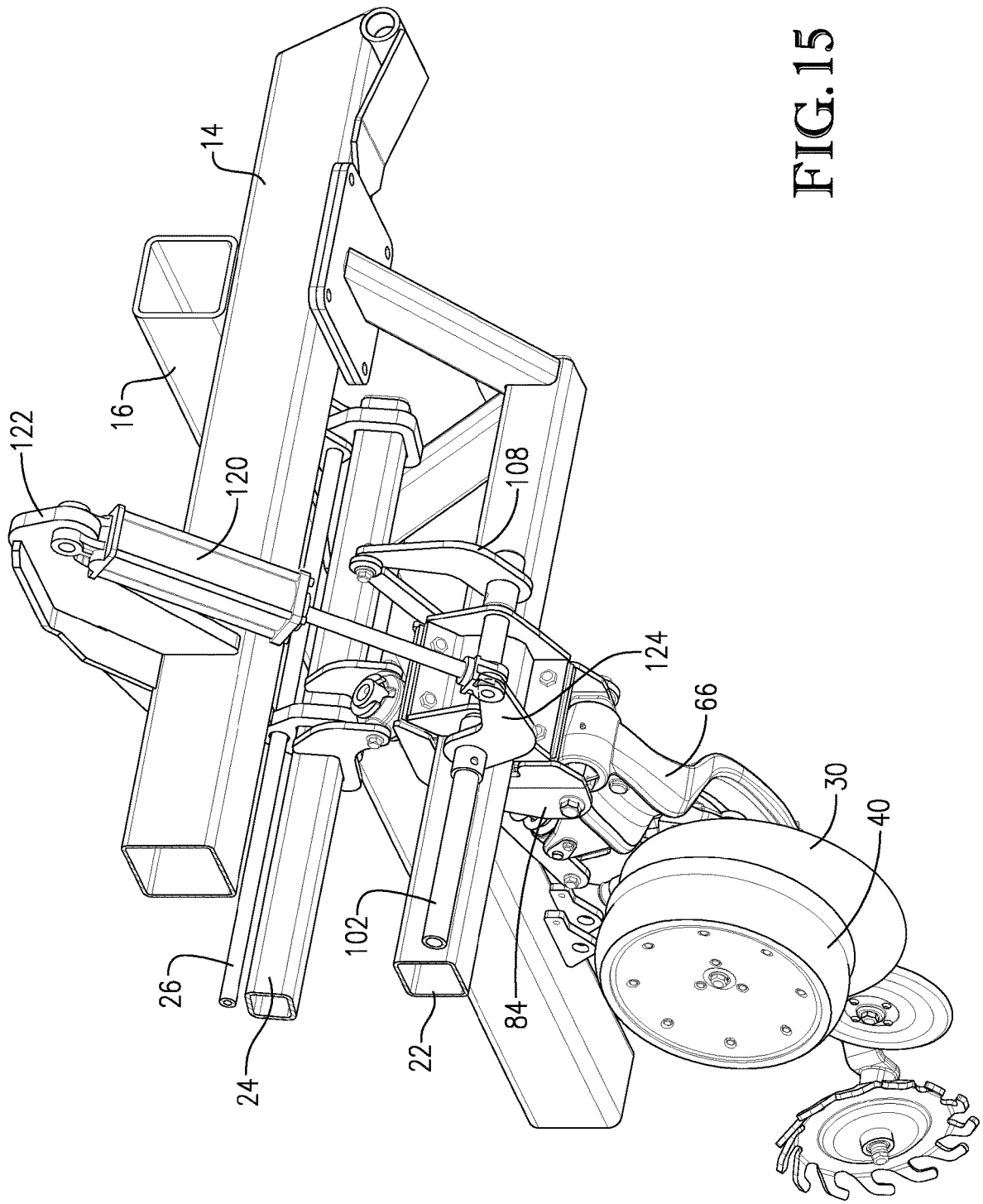
FIG. 15 is a forward perspective view of one of the ground openers from FIG. 14, with a portion of the frame removed to illustrate the ground opener's connection to the depth-adjustment assembly.

In more detail, as perhaps best illustrated in FIGS. 14 and 15, rotation of the common pivot bar 102 for a given opener set 18 will cause a corresponding actuation of the parallel linkage assemblies 106 and the depth-adjustment arms 104 associated with each of the ground openers 20 of the particular opener set 18. As such, the operating depths of each of the ground openers 20 can be simultaneously adjusted via the depth-adjustment assembly 100 of embodiments of the present invention. In some embodiments, the common pivot bar 102 will be rotated by an actuator 120. The actuator 120 may comprise a hydraulic cylinder, an electric actuator, a pneumatic actuator, a motor, a gear assembly, or the like. For instance, as illustrated in FIG. 14, the actuator 120 may comprise a hydraulic cylinder that extends between the frame 12 of the disc drill 10 (e.g., via mounting arm 122) and a pivot arm 124 rigidly secured to the pivot bar 102. In other embodiments, the actuator 120 may extend between the frame 12 and the first pivot arm 108 of one of the ground openers 20. In such a configuration, extension or retraction of the actuator 120 will cause a rotation of the common pivot bar 102, which as described above, will cause a corresponding adjustment of the operating depths of each of the ground openers of the associated opener set 18. In other embodiments, the depth-adjustment assembly 100 may include a plurality of actuators 120 for rotating the common pivot bar 102.

Embodiments of the present invention may provide for the actuator 120 to be controlled remotely by the operator of the disc drill 10. For instance, the actuator 120 may be controlled by the operator, as the operator is positioned in a cab of the tractor pulling the disc drill. Thus, the operating depths of each of the ground openers 20 of the disc drill 10 (or each of the ground openers 20 of one or more of the opener sets 18) may be simultaneously adjusted remotely by the operator during operation of the disc drill 10. Such a feature provides a benefit over prior disc drills, which required the operators to adjust the operating depths of each of the ground openers individually (and manually), while the disc drill 10 was at a stop. As was noted above, embodiments also provide for the heights and/or down-pressures/downforces of the ground openers 20 to be controlled by the operator remotely (via the actuators 96 rotating the rockshaft 24). As such, embodiments of the present invention provide for the remote simultaneous raising and/or lowering of the ground openers 20 of the disc drill 10, controlling of the down-pressures/downforces of the ground openers 20, as well as a simultaneous adjustment of the operating depths of each of the ground openers 20 of one or more opener sets 18 of the disc drill 10. In some embodiments, the raising and/or lowering and/or adjustment of the down-pressures/downforces of the ground openers 20 may be performed simultaneously with the adjusting of the operating depths of the ground openers 20. As described above, the height and/or the down-pressure of the ground openers 20, as well as the operating depths of the ground openers 20, may be simultaneously controlled by an operator of the disc drill 10 as the operator is positioned within a cab of the tractor propelling the disc drill. However, in other embodiments, such control may be automated, such as by a control system that receives input from various types of sensors, such as load sensors, position sensors, GPS sensors, etc.

Figure 16:
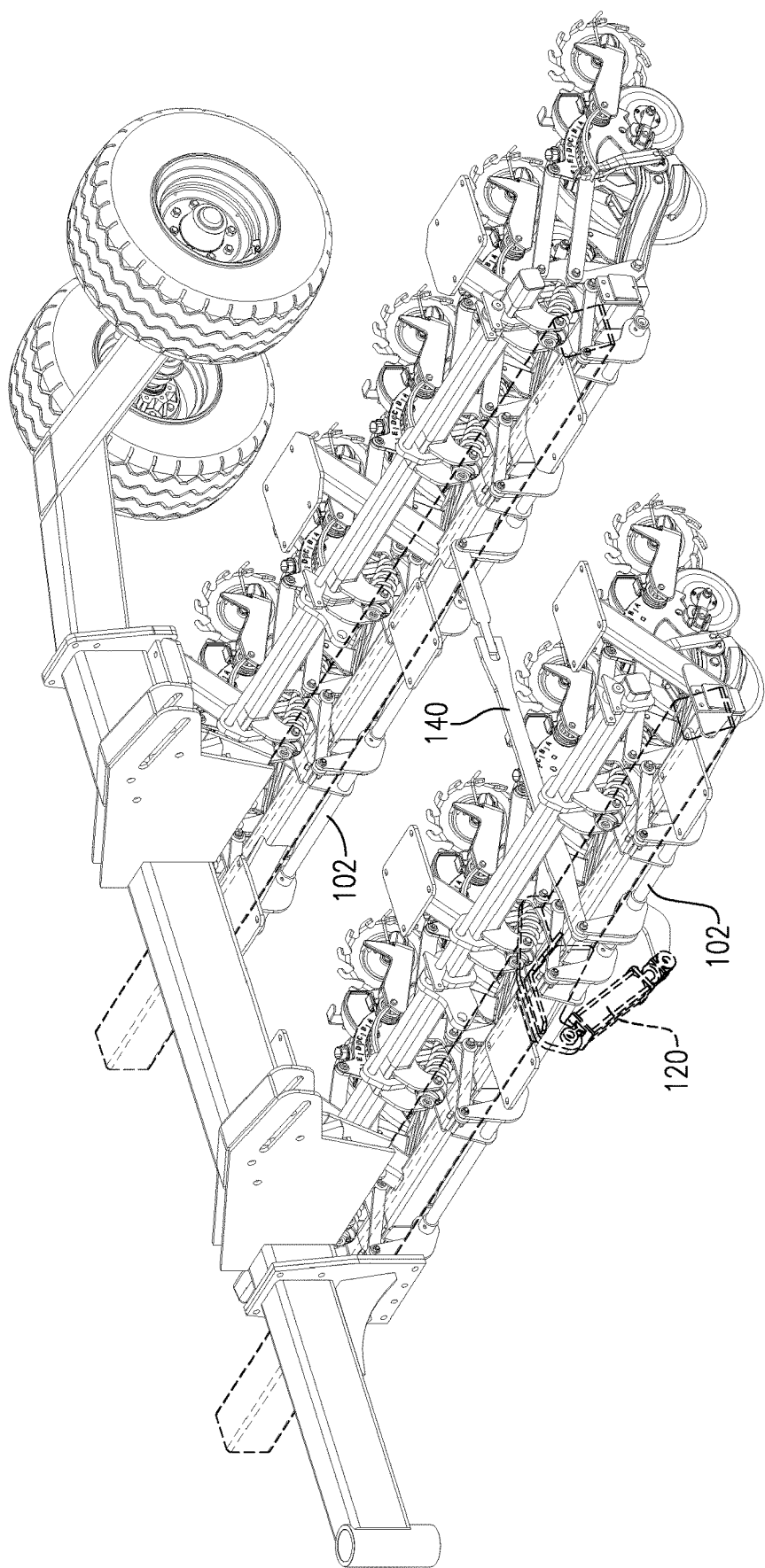
FIG. 16 is a side perspective view of a front opener set and a rear opener set of ground openers, with a mechanical linkage connecting the opener sets to allow simultaneous adjustment of operating depths of the ground openers from both the front and rear opener sets.

Although the invention has been described with reference to the one or more embodiments illustrated in the figures, it is understood that equivalents may be employed and substitutions made herein without departing from the scope of the invention as recited in the claims. For example, as illustrated in FIG. 16, certain embodiments of the present invention may include a linkage 140 that extends between a front opener set 18 of ground openers 20 and a rear opener set 18 of ground openers 20. Specifically, the linkage 140 may be a mechanical linkage that operably connects the pivot bar 102 of the front opener set 18 of ground openers 20 and the pivot bar 102 of the rear opener set 18 of ground openers 20. Specifically, the linkage 140 is shown extending from the pivot arm 124 of the front opener set 18 pivot bar 102 to the pivot arm 124 of the rear opener set 18 pivot bar 102. In such embodiments, one or more actuators 120 associated with either the front opener set 18 of ground openers 20 or the rear opener set 18 of ground openers 20 can be used to adjustment the operating depths of each of the ground openers 20 in both the front and rear opener sets 18. In more detail, as shown in FIG. 16, a single actuator 120 is illustrated being positioned in association with a front opener set 18 of ground openers 20. As was described previously, actuation of such actuator 120 will cause a rotation of pivot bar 102 of the front opener set 18, resulting in an adjustment of the operating depths of each of the ground openers 20 in the front opener set 18. However, due to the presence of the linkage 140 that operably connects the pivot bar 102 of the front opener set 18 with the pivot bar 102 of the rear opener set 18, actuation of the actuator 120 will cause a simultaneous rotation of both pivot bars 102 of the front and rear opener sets 18, resulting in a simultaneous adjustment of the operating depths of each of the ground openers 20 in both the front and rear opener sets 18.

Having thus described one or more embodiments of the invention, what is claimed as new and desired to be protected by Letters Patent includes the following:

What is claimed is:

1. A ground-opening apparatus for an agricultural implement, said ground-opening apparatus comprising:
    an opening disc for excavating a furrow in the ground, wherein said opening disc is configured to rotate about a rotational axis that extends through a center of said opening disc; and
    a support assembly securing said opening disc to the agricultural implement,
    wherein said support assembly comprises an upper bar, a lower bar, a forward bar, and an opener body, wherein said upper bar and said lower bar extend generally in parallel relationship, and wherein said lower bar and said opener body are joined at a lower, rearward joint,
    wherein the rotational axis of said opening disc extends through the lower, rearward joint of said support assembly.

2. The ground-opening apparatus of claim 1, wherein said rotational axis of said opening disc is presented by a spindle about which said opening disc is configured to rotate.

3. The ground-opening apparatus of claim 2, further comprising:
    a gauge wheel for establishing a depth at which said opening disc excavates the ground to create the furrow;
    a depth-adjustment handle connected to said spindle and configured to adjust a relative position between said opening disc and said gauge wheel.

4. The ground-opening apparatus of claim 3,
    wherein said spindle comprises a gauge wheel adjustment spindle,
    further comprising a gauge arm extending from said gauge wheel adjustment spindle to a gauge wheel rotation spindle about which said gauge wheel is configured to rotate.

5. The ground-opening apparatus of claim 2, wherein said opener body pivotally floats about said spindle.

6. The ground-opening apparatus of claim 1, further comprising a closing wheel extending rearward from said opener body, wherein said closing wheel is configured to fill in the furrow with soil.

7. The ground-opening apparatus of claim 1, wherein said upper bar is pivotally secured to said opener body at an upper, rearward joint, wherein the upper, rearward joint is spaced apart from the lower, rearward joint.

8. The ground-opening apparatus of claim 7, wherein the upper, rearward joint presents an axis that is generally parallel with the rotational axis of said opening disc that extends through the lower, rearward joint.

9. The ground-opening apparatus of claim 1, wherein said support assembly comprises a four-bar linkage including said forward bar, said upper bar, said lower bar, and said opener body, wherein only said upper bar and said lower bar of said four-bar linkage are secured to said opener body.

10. The ground-opening apparatus of claim 1, wherein said upper bar and said lower bar are pivotally secured to said forward bar, wherein said forward bar is rigidly secured to a toolbar of the agricultural implement.

11. The ground-opening apparatus of claim 1, further comprising a down-pressure device extending between said support assembly and a rockshaft of the agricultural implement.

12. The ground-opening apparatus of claim 11, wherein said down-pressure device comprises a spring.

13. An agricultural implement comprising:
a plurality of ground-opening apparatuses, where each of said ground-opening apparatuses includes—
an opening disc for excavating a furrow in the ground, wherein said opening disc is configured to rotate about a rotational axis that extends through a center of said opening disc; and
a support assembly securing said opening disc to said agricultural implement,
wherein said support assembly comprises an upper bar, a lower bar, a forward bar, and an opener body, wherein said upper bar and said lower bar extend generally in parallel relationship, and wherein said lower bar and said opener body are joined at a lower, rearward joint,
wherein the rotational axis of said opening disc extends through the lower, rearward joint of said support assembly.

14. The agricultural implement of claim 13, wherein said rotational axis of said opening disc of each ground-opening apparatus is presented by a spindle about which said opening disc is configured to rotate.

15. The agricultural implement of claim 14, wherein each ground-opening apparatus further comprises:
a gauge wheel for establishing a depth at which said opening disc excavates the ground to create the furrow;
a depth-adjustment handle connected to said spindle and configured to adjust a relative position between said opening disc and said gauge wheel.

16. The agricultural implement of claim 14, wherein said opener body pivotally floats about said spindle.

17. The agricultural implement of claim 13, wherein said support assembly comprises a four-bar linkage including said forward bar, said upper bar, said lower bar, and said opener body, wherein only said upper bar and said lower bar of said four-bar linkage are secured to said opener body.

18. A method of forming a furrow with an agricultural implement that includes at least one ground-opening apparatus, said method comprising the steps of:
(a) supporting the ground-opening apparatus by a support assembly that includes an upper bar, a lower bar, a forward bar, and an opener body, wherein the upper bar and the lower bar extend generally in parallel relationship, and wherein the lower bar and the opener body are joined at a lower, rearward joint; and
(b) forming the furrow by excavating the ground soil with an opening disc of the ground-opening apparatus, wherein the opening disc is configured to rotate about a rotational axis that extends through a center of the opening disc, wherein the rotational axis of the opening disc extends through the lower, rearward joint of the support assembly.

19. The method of claim 18, wherein the rotational axis of the opening disc is presented by a spindle about which the opening disc is configured to rotate, and wherein the method further comprises the step of the opener body pivotally floating about the spindle.

20. The method of claim 18, wherein the ground-opening apparatus further comprises a gauge wheel for establishing a depth at which the opening disc excavates the ground to create the furrow, and wherein the method further comprises actuating a depth-adjustment handle connected to a spindle so as to adjust a relative position between the opening disc and the gauge wheel.

* * * * *